United States Patent
Hodges et al.

(10) Patent No.: US 10,643,477 B2
(45) Date of Patent: May 5, 2020

(54) SYSTEMS AND METHODS FOR PERFORMING DRIVER AND VEHICLE ANALYSIS AND ALERTING

(71) Applicant: VERIZON PATENT AND LICENSING INC., Basking Ridge, NJ (US)

(72) Inventors: Eric Todd Hodges, Dana Point, CA (US); Alexander C. Gee, Christchurch (NZ); Ralph Joseph Maier, Austin, TX (US); John Thomas Morris, Round Rock, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 113 days.

(21) Appl. No.: 15/241,406

(22) Filed: Aug. 19, 2016

(65) Prior Publication Data
US 2017/0140652 A1    May 18, 2017

Related U.S. Application Data

(63) Continuation of application No. 14/921,879, filed on Oct. 23, 2015, now Pat. No. 9,424,751.

(60) Provisional application No. 62/068,256, filed on Oct. 24, 2014.

(51) Int. Cl.
| | | |
|---|---|---|
| G08G 1/00 | (2006.01) | |
| G07C 5/00 | (2006.01) | |
| G07C 5/08 | (2006.01) | |
| G06F 3/0484 | (2013.01) | |
| G07C 5/02 | (2006.01) | |
| G08G 1/0967 | (2006.01) | |

(52) U.S. Cl.
CPC .......... G08G 1/20 (2013.01); G06F 3/04842 (2013.01); G07C 5/008 (2013.01); G07C 5/02 (2013.01); G07C 5/0816 (2013.01); G08G 1/0967 (2013.01)

(58) Field of Classification Search
CPC ........ G08G 1/20; G08G 1/0967; G07C 5/008; G07C 5/0816; G07C 5/02; G06F 3/04842
See application file for complete search history.

(56) References Cited

U.S. PATENT DOCUMENTS

| | | | |
|---|---|---|---|
| 8,463,488 B1 * | 6/2013 | Hart | G07C 5/008 340/576 |
| 8,509,987 B2 | 8/2013 | Resner | |
| 8,552,847 B1 | 10/2013 | Hill | |
| 8,630,768 B2 | 1/2014 | McClellan | |
| (Continued) | | | |

OTHER PUBLICATIONS

"A remote attack on an aftermarket telematics service", Argus Cyber Security—Zubie Device, 5 pages, http://www.argus-sec.com/blog/remote-attack-aftermarket-telematics-service/, accessed Oct. 1, 2015.

(Continued)

*Primary Examiner* — Thomas E Worden

(57) ABSTRACT

Systems and methods are disclosed for collecting vehicle data from a vehicle engine computer of a vehicle and a plurality of sensors disposed about the vehicle and generating feedbacks for a driver of the vehicle using at least the vehicle data. The systems and methods additionally provide for receiving user inputs from the driver responding to the feedbacks so that the user inputs are associated with corresponding rule violations that triggered the feedbacks.

19 Claims, 9 Drawing Sheets

(56) References Cited

U.S. PATENT DOCUMENTS

| | | | |
|---|---|---|---|
| 9,129,460 B2 | 9/2015 | McClellan | |
| 9,135,759 B2 | 9/2015 | Baer et al. | |
| 9,524,269 B1* | 12/2016 | Brinkmann | G06F 17/00 |
| 9,535,878 B1* | 1/2017 | Brinkmann | G06F 17/00 |
| 2010/0007523 A1* | 1/2010 | Hatav | G01C 21/26 340/901 |
| 2010/0207751 A1* | 8/2010 | Follmer | G01C 21/32 340/439 |
| 2011/0320492 A1* | 12/2011 | Inghelbrecht | G06Q 40/08 707/776 |
| 2012/0123632 A1 | 5/2012 | Nejah | |
| 2012/0123806 A1* | 5/2012 | Schumann, Jr. | G06Q 40/08 705/4 |
| 2012/0253670 A1* | 10/2012 | Nagda | G01C 21/26 701/500 |
| 2012/0307064 A1 | 12/2012 | Schenken et al. | |
| 2012/0323690 A1* | 12/2012 | Michael | G06Q 30/02 705/14.58 |
| 2013/0110310 A1* | 5/2013 | Young | B60W 40/09 701/1 |
| 2013/0290199 A1* | 10/2013 | Camacho | G01S 19/49 705/317 |
| 2013/0297387 A1* | 11/2013 | Michael | G08G 1/0112 705/13 |
| 2014/0195310 A1 | 7/2014 | McQuade | |
| 2015/0197247 A1 | 7/2015 | Lchinokawa | |
| 2015/0246654 A1* | 9/2015 | Tadic | B60W 40/09 340/436 |
| 2017/0146801 A1* | 5/2017 | Stempora | G02B 27/0172 |

OTHER PUBLICATIONS

"Fleet Management & Vehicle Tracking", TomTom Telematics, 1 page, http://business.tomtom.com/en_gb/, accessed Oct. 20, 2015, copyright 2015 TomTom Telematics BV.

"Fleet Management Professionals", http://www.astrata.eu/, Astrata Europe B.V., 8 pages, accessed Oct. 21, 2015, © 2015 Astrata Europe B.V.

"Fleet Management-GPS Vehicle Tracking Geotab", A World Leading Fleet Tracking Device, 7 pages, http://www.geotab.com/, accessed Oct. 20, 2015, Copyright 2015. Geotab Inc.

"Fleet-ready Navigators Partners", Garmin, 2 pages, http://www8.garmin.com/solutions/mobile-resource-management/partners/, accessed Oct. 20, 2015.

"MiX Telematics", 6 pages, http://www.mixtelematics.com/, © 2014 Mix Telematics, accessed Oct. 20, 2015.

"Monitoring Driver Behavior Can Improve Safety, Reduce Costs", Article-TruckingInfo.com, 10 pages, http://www.truckinginfo.com/article/story/2011/11/monitoring-driver-behavior-can-improve-safety-reduce-costs.apx, dated Nov. 2011.

"Navman Wireless", 2 pages, http://www.navmanwireless.com/, accessed Oct. 20, 2015, © 2015 Navman Wireless.

"OBD Aftermarket Devices", Geotab, 3 pages, http://www.geotab.com/obd-aftermarket-devices/, accessed Oct. 1, 2015, Copyright (c) 2015 Geotab Inc.

"One Platform for Connected Intelligence", Telogis, 6 pages, http://www.telogis.com/, accessed Nov. 23, 2015, copyright 2015.

"Solutions for Drivers", Vehco corporate, 2 pages, http://www.vehcogroup.com/, accessed Oct. 20, 2015.

"Telematics & Compliance", Fleet Telematics, DOT Compliance Software, GPS Fleet Tracking, 3 pages, http://www.descartes.com/solutions/routing-mobile-telematics/telematics-compliance, accessed Oct. 1, 2015.

"Telogis Puts Next-Generation Solutions in the Hands of the Mobile Worker", 5 pages, http://www.telogis.com/press-releases/next-generation-mobile-workers, dated May 22, 2013.

"Telogis Unveils a suite of New Products designed to improve productivity,", 3 pages, http://fleetowner.com/technology/telogis-unveils-suite-new-products-designed-improve-productivity, dated Jun. 5, 2013.

"The Impact of Measuring Driver and Vehicle Behavior", 7 pages, http://www.teletrac.com/teletrac/conten/fleet-tools/whitepaper/10152014-impact-of-measuring-driver-vehicle-behavior.pdf, accessed Oct. 1, 2015.

"The Proactive Approach to Vehicle and Driver Safety", Inthinc Safety-Generic, Safety, 5 pages, http://www.inthinc.com/safety, accessed Oct. 8, 2015, © 2015 inthinc.

"Transforming the Way the World Works", Trimble, 1 page, http://www.trimble.com/, accessed Oct. 20, 2015, copyright 2015 Trimble Navigation Limited.

"Trucking Software", Teletrac, 6 pages, http://www.teletrac.com/trucking-software, accessed Oct. 20, 2015, © 2015 Teletrac Inc.

"Vehicle Telematics", Batrak, 6 pages, http://www.batrak.co.uk/vehicle, accessed Oct. 1, 2015, copyright (c) 2015—Batrak Ltd.

"Vehicle Tracking", Verilocation 8 pages, http://www.verilocation.com/vehicle-tracking/, accessed Oct. 1, 2015, copyright (c) 2015 Verilocation Inc.

"Vehicle Tracking, Fleet & Asset Tracking", Driver Performance Management, Mastemaut, 6 pages, http://www.masternaut.com/, accessed Oct. 20, 2015, Copyright 2015 Mastemaut Limited.

"Wabco Debuts New Fleet Management Solution TX-TRAILERGUARD at IAA Commercial Vehicles 2014", Transics—a WABCO Company, 7pages, http://www.transics.com/wabco-debuts-new-fleet-management-solution-tx-trailguard-iaa-commercial-vehicles-2014-first-integrated-platform-launched-transics-acquisition/, dated Sep. 23, 2014.

Clark, "Will your next car wake you up when you fall asleep at the wheel?", Drowsy Driver Alert System, 2 pages, http://auto.howstuffworks.com/car-driving-safety/safety-regulatory-devices/car-wake-vou-up1.htm, accessed Oct. 14, 2015.

* cited by examiner

SYSTEMS AND METHODS FOR PERFORMING DRIVER AND VEHICLE ANALYSIS AND ALERTING

RELATED APPLICATIONS

Any and all applications, if any, for which a foreign or domestic priority claim is identified in the Application Data Sheet of the present application are hereby incorporated by reference under 37 CFR 1.57.

BACKGROUND

A vehicle management system and in-vehicles devices can be used to assist in planning and servicing routes of a fleet of vehicles.

SUMMARY

In some embodiments, a system is disclosed for collecting vehicle data from a vehicle engine computer installed in an engine of a vehicle or a plurality of sensors disposed about the vehicle, generating feedbacks for a driver of the vehicle using at least the vehicle data, and communicating inputs from the driver responding to the feedbacks to enable the driver to address the feedbacks. The system can include: an electronic device comprising digital logic circuitry and configured to be installed in a vehicle, the electronic device comprising a port configured to couple with a vehicle engine computer installed in an engine of the vehicle and have wired or wireless connections with a plurality of sensors disposed about the vehicle; and a first memory device in communication with the electronic device, the first memory device storing: a plurality of rules prescribing rule violations associated with activities of the vehicle, and a plurality of driver feedbacks prescribing feedbacks to a driver of the vehicle about the rule violations. The electronic device can be configured to: while the driver is operating the vehicle, determine in real time a first rule violation of the rule violations by the vehicle based at least on a comparison of the plurality of rules to vehicle data received from the vehicle engine computer or the plurality of sensors; in response to determining the first rule violation, determine in real-time a first feedback of the feedbacks to the driver from the plurality of driver feedbacks based at least on the first rule violation; in response to determining the first feedback, output in real time the first feedback for presentation to the driver; receive, via a selectable interface element or an acoustic sensor, a first user input from the driver responding to the first feedback, the first user input comprising an explanation by the driver for the first rule violation or a request from the driver to discuss the first rule violation at a later time; store, in a second memory device, the first user input in association with an indication of the first rule violation; and transmit the first user input and the indication of the first rule violation to a vehicle management system so that the first user input and the indication of the first rule violation are presented to a manager of the vehicle.

The system of the preceding paragraph can include one or more of the following features: The electronic device can be configured to receive the first user input via the acoustic sensor, and the acoustic sensor can be configured to initiate capture of the first user input in response to the driver providing an audio input that matches a capture initiation input. The electronic device can be configured to: output the first feedback as an alert on a display device, the display device comprising the selectable interface element; output a plurality of textual explanations for the first rule violation on the display device; and receive the first user input via a selection on the display device by the driver of one of the plurality of textual explanations for the first rule violation. Subsequent to receiving the first user input, the electronic device can be configured to: while the driver is operating the vehicle, determine in real time a second rule violation of the rule violations by the vehicle based at least on (i) the comparison of the plurality of rules to the vehicle data and (ii) the first user input; in response to determining the second rule violation, determine in real time a second feedback of the feedbacks to the driver from the plurality of driver feedbacks based at least on the second rule violation; and in response to determining the second feedback, output in real time the second feedback for presentation to the driver. The electronic device can be configured to: receive, from the vehicle management system, user input data associated with user inputs from a plurality of drivers of a vehicle fleet that includes the vehicle, the user inputs being from the plurality of drivers responding to feedbacks associated with the rule violations by vehicles of the vehicle fleet driven by the plurality of drivers; and change the plurality of rules or the plurality of driver feedbacks stored in the first memory device based at least on the user input data. The electronic device can be configured to: transmit the first user input and the indication of the first rule violation to the vehicle management system so that the first user input and the indication of the first rule violation are presented together to the manager; while a driver is operating the vehicle, determine in real time a second rule violation of the rule violations by the vehicle based at least on the comparison of the plurality of rules to the vehicle data; in response to determining the second rule violation, determine in real time a second feedback of the feedbacks to the driver from the plurality of driver feedbacks based at least on the second rule violation; in response to determining the second feedback, output in real time the second feedback for presentation to the driver; and in response to not receiving a second user input from the driver responding to the second feedback, transmit an indication of the second rule violation to the vehicle management system so that the indication of the second rule violation is presented to the manager differently than the indication of the first rule violation. The first rule violation can comprise a hard braking by the vehicle during which the vehicle experiences more than a threshold deceleration. The electronic device can be configured to no longer accept the first user input when the first user input is not received from the driver within a threshold period of time subsequent to the electronic device outputting the first feedback. The electronic device can be configured to remove the indication of the first rule violation from a driver profile associated with the driver based at least on the first user input. The driver can be causing the vehicle to move when the driver is operating the vehicle. The first user input can comprise the explanation by the driver for the first rule violation. The first user input can comprise the request from the driver to be prompted at the later time to discuss the first rule violation, and the electronic device can be configured to prompt the driver at the later time to discuss the first rule violation in response to receiving the first user input.

In some embodiments, a method is disclosed for collecting vehicle data from a vehicle engine computer installed in an engine of a vehicle or a plurality of sensors disposed about the vehicle, generating feedbacks for a driver of the vehicle using at least the vehicle data, and processing inputs from the driver responding to the feedbacks to enable the driver to address the feedbacks. The method can include:

under control of an electronic device comprising digital logic circuitry and installed in a vehicle, the electronic device comprising a port coupled with a vehicle engine computer installed in an engine of the vehicle and having wired or wireless connections with a plurality of sensors disposed about the vehicle: while a driver is operating the vehicle, determining in real time a first rule violation of rule violations by the vehicle based at least on a comparison of a plurality of rules to vehicle data received from the vehicle engine computer or the plurality of sensors, the plurality of rules prescribing the rule violations associated with activities of the vehicle and retrieved from a first memory device in communication with the electronic device; in response to determining the first rule violation, determining in real-time a first feedback of feedbacks to the driver from a plurality of driver feedbacks based at least on the first rule violation, the plurality of driver feedbacks prescribing the feedbacks to the driver about the rule violations and retrieved from the first memory device; in response to determining the first feedback, outputting in real time the first feedback for presentation to the driver; receiving, via a selectable interface element or an acoustic sensor, a first user input from the driver responding to the first feedback, the first user input comprising an explanation by the driver for the first rule violation or a request from the driver to discuss the first rule violation at a later time; storing, in a second memory device, the first user input in association with an indication of the first rule violation; and in response to a request from the driver, accessing the first user input and the indication of the first rule violation from the second memory device and outputting information associated with the first user input and the indication of the first rule violation for presentation to the driver on a display device.

The method of the preceding paragraph can include one or more of the following features: The method can further include: under control of the electronic device: capturing in real-time image data with an image sensor in response to determining the first rule violation; and storing, in a third memory device, the image data and an association with the first user input and the indication of the first rule violation. The method can further include: under control of the electronic device: while the driver is operating the vehicle, determining in real time another occurrence of the first rule violation by the vehicle based at least on the comparison of plurality of rules to the vehicle data; in response to determining the another occurrence of the first rule violation, determining in real time a second feedback of the feedbacks to the driver from the plurality of driver feedbacks based at least on the another occurrence of the first rule violation and the first user input, the second feedback being different from the first feedback; and in response to determining the second feedback, outputting in real time the second feedback for presentation to the driver. The method can further include: under control of the electronic device: updating a driver score associated with the driver based at least on the first rule violation and the first user input to generate an updated driver score, the driver score comprising a value indicative of a driving performance by the driver and depending on a plurality of metrics related to the driving performance; and outputting the updated driver score for presentation to the driver on the display device. The method can further include: under control of the electronic device: requesting the first user input from the driver in response to an inquiry message received from a vehicle management system via a wireless communication network.

In some embodiments, non-transitory physical computer storage comprising instructions stored thereon for implementing, in one or more processors, a method comprising: while a driver is operating a vehicle, determining in real time a first rule violation of rule violations by the vehicle based at least on a comparison of a plurality of rules to vehicle data received from an vehicle engine computer of the vehicle or a plurality of sensors disposed about the vehicle, the plurality of rules prescribing the rule violations associated with activities of the vehicle and retrieved from a first memory device; in response to determining the first rule violation, determining in real time a first feedback of feedbacks to the driver from a plurality of driver feedbacks based at least on the first rule violation, the plurality of driver feedbacks prescribing the feedbacks to the driver about the rule violations and retrieved from the first memory device; in response to determining the first feedback, outputting in real time the first feedback for presentation to the driver; receiving, via a selectable interface element or an acoustic sensor, a first user input from the driver responding to the first feedback, the first user input comprising an explanation by the driver for the first rule violation or a request from the driver to discuss the first rule violation at a later time; and storing, in a second memory device, the first user input in association with an indication of the first rule violation.

The non-transitory physical computer storage of the preceding paragraph can include one or more of the following features: The first rule violation can comprise an acceleration or deceleration event by the vehicle during which the vehicle experiences more than a threshold acceleration or deceleration. The method can further comprise receiving the first user input via the selectable interface element.

In some embodiments, a system is disclosed for collecting vehicle data from a vehicle engine computer installed in an engine of a vehicle or a plurality of sensors disposed about the vehicle, evaluating a driving performance of the vehicle using at least the vehicle data, and limiting driver access to information indicative of the driving performance to certain times. The system can include: an electronic device comprising digital logic circuitry and configured to be installed in a vehicle of a vehicle fleet, the electronic device comprising a port configured to couple with a vehicle engine computer installed in an engine of the vehicle and have wired or wireless connections with a plurality of sensors disposed about the vehicle; and a first memory device in communication with the electronic device. The first memory device can store: a plurality of program instructions prescribing conditions of a vehicle to be monitored for a status tracking program, and a plurality of access instructions prescribing when a driver of the vehicle is permitted to access information determined for the status tracking program. The electronic device can be configured to: in accordance with the plurality of program instructions retrieved from the first memory device, calculate a driver score for the driver based at least on a comparison of (i) vehicle data received from the vehicle engine computer or the plurality of sensors to (ii) the conditions of the vehicle to be monitored for the status tracking program, the driver score being indicative of a driving performance by the vehicle when driven by the driver; receive, from a vehicle management system, a plurality of driver scores for a plurality of drivers of other vehicles in the vehicle fleet, the plurality of driver scores being indicative of driving performances by the other vehicles when driven by the plurality of drivers and calculated in accordance with the plurality of program instructions; determine whether the driver is permitted to access the driver score and the plurality of driver scores in accordance with the plurality of access instructions retrieved from the first memory device; and in response to determining that the driver is permitted to access the driver score and the plurality of driver scores, output the driver score and the plurality of driver scores for presentation together on a display to the driver.

The system of the preceding paragraph can include one or more of the following features: The plurality of access instructions can indicate that the driver is permitted to access the driver score and the plurality of driver scores during a first time period and is not permitted to access the driver score and the plurality of driver scores during a second time period different from the first time period. The first time period can comprise a time period when the vehicle is not moving, and the second time period can comprise a time period when the vehicle is moving. The first time period can comprise working hours for the driver, and the second time period can comprise non-working hours for the driver. A length of the first time period can depend at least on a driving history associated with the driver. The driving history can comprise a value indicative of a level of experience of the driver. The driving history can comprise an accident record associated with the driver. The electronic device can be configured to adjust the plurality of access instructions stored in the first memory device in accordance with a command message received from the vehicle management system via a wireless communication network, so that the plurality of access instructions indicate that the driver is permitted to access the driver score and the plurality of driver scores at a time when the driver was previously unpermitted to access the driver score and the plurality of driver scores prior to adjustment of the access instructions. The electronic device can be configured to: determine whether the driver is driving the vehicle for a work task in accordance with a work instruction for the driver received from the vehicle management system; in response to determining that the driver is driving the vehicle for the work task, calculate the driver score based at least on the vehicle data from performance of the work task; and in response to determining that the driver is driving the vehicle for a non-work task, not calculate the driver score based at least on the vehicle data from performance of the non-work task. The driver score and the plurality of driver scores can be indicative of fuel efficiencies of the vehicle and the other vehicles when driven by the driver and the plurality of drivers.

In some embodiments, a method is disclosed for collecting vehicle data from a vehicle engine computer installed in an engine of a vehicle or a plurality of sensors disposed about the vehicle, evaluating a driving performance of the vehicle using at least the vehicle data, and limiting driver access to information indicative of the driving performance to certain times. The method can include: under control of an electronic device comprising digital logic circuitry and installed in a vehicle of a vehicle fleet, the electronic device comprising a port coupled with a vehicle engine computer installed in an engine of the vehicle and having wired or wireless connections with a plurality of sensors disposed about the vehicle: in accordance with a plurality of program instructions retrieved from a first memory device, calculating a driver score for a driver of the vehicle based at least on a comparison of (i) vehicle data received from the vehicle engine computer or the plurality of sensors to (ii) conditions of the vehicle to be monitored for a status tracking program, the plurality of program instructions prescribing the conditions of the vehicle to be monitored for the status tracking program, the driver score being indicative of a driving performance by the vehicle when driven by the driver; receiving, from a vehicle management system, a plurality of driver scores for a plurality of drivers of other vehicles in the vehicle fleet, the plurality of driver scores being indicative of driving performances by the other vehicles when driven by the plurality of drivers and calculated in accordance with the plurality of program instructions; determining whether the driver is permitted to access the driver score and the plurality of driver scores in accordance with a plurality of access instructions retrieved from the first memory device, the plurality of access instructions prescribing when the driver is permitted to access information determined for the status tracking program; and in response to determining that the driver is not permitted to access the driver score and the plurality of driver scores, denying a request from the driver to output the driver score and the plurality of driver scores for presentation to the driver.

The method of the preceding paragraph can include one or more of the following features: The method can further include: under control of the electronic device: in response to determining that the driver is permitted to access the driver score and the plurality of driver scores, outputting the driver score and the plurality of driver scores for presentation together to the driver. The method can further include: under control of the electronic device: transmitting an initiation message to the vehicle management system, the initiation message requesting that the driver and the vehicle participate in the status tracking program; and receiving an acknowledgement message from the vehicle management system, the acknowledgement message indicating that the driver and the vehicle are approved to participate in the status tracking program. The method can further include: under control of the electronic device: receiving the plurality of program instructions from the vehicle management system in response to transmitting the initiation message. The driver score and the plurality of driver scores can be indicative of proportions of on-time deliveries by the vehicle and the other vehicles when driven by the driver and the plurality of drivers.

In some embodiments, non-transitory physical computer storage comprising instructions stored thereon for implementing, in one or more processors, a method comprising: in accordance with a plurality of program instructions retrieved from a first memory device, calculating a driver score for a driver of a vehicle in a vehicle fleet based at least on a comparison of (i) vehicle data received from an vehicle engine computer of the vehicle or a plurality of sensors disposed about the vehicle to (ii) conditions of the vehicle to be monitored for a status tracking program, the plurality of program instructions prescribing the conditions of the vehicle to be monitored for the status tracking program, the driver score being indicative of a driving performance by the vehicle when driven by the driver; receiving, from a vehicle management system, a plurality of driver scores for a plurality of drivers of other vehicles in the vehicle fleet, the plurality of driver scores being indicative of driving performances by the other vehicles when driven by the plurality of drivers and calculated in accordance with the plurality of program instructions; in response to a request from the driver to view the driver score or the plurality of driver scores, determining whether the driver is permitted to access the driver score or the plurality of driver scores in accordance with a plurality of access instructions retrieved from the first memory device, the plurality of access instructions prescribing when the driver is permitted to access information determined for the status tracking program; in response to determining that the driver is permitted to access the driver score or the plurality of driver scores, outputting the driver score or the plurality of driver scores for presentation on a display to the driver in accordance with the request; and in response to determining that the driver is not permitted to access the driver score or the plurality of driver scores, outputting an alert for presentation to the driver on the display, the alert indicating that the driver is not currently permitted to access the driver score or the plurality of driver scores.

The non-transitory physical computer storage of the preceding paragraph can include one or more of the following features: The alert can further indicate a reason that the driver is not currently permitted to access the driver score or the plurality of driver scores, the reason corresponding to an access limitation prescribed by the plurality of access instructions. The plurality of access instructions can indicate that the driver is permitted to access the driver score or the plurality of driver scores during a first time period and is not permitted to access the driver score or the plurality of driver scores during a second time period different from the first time period. The method can further include: determining whether the driver is driving the vehicle for a non-work task in accordance with a work instruction for the driver; and in response to determining that the driver is driving the vehicle for the non-work task, not calculating the driver score based at least on the vehicle data from performance of the non-work task. The driver score and the plurality of driver scores can be indicative of counts of rule violations by the vehicle and the other vehicles when driven by the driver and the plurality of drivers.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

FIGS. 5 and 6A-6D illustrate example user interfaces for outputting real-time feedback and receiving user input.

DETAILED DESCRIPTION

I. Introduction

Driver performance can be important to the successful operation of a fleet of vehicles. Drivers are expected to follow the rules of the road, as well as the safety considerations while operating the vehicles of the fleet. Moreover, vehicle and fleet management systems generally strive to maintain fleet vehicles in good operating condition. Vehicles undergo scheduled maintenance and other vehicles services in order to keep the vehicles in good operating condition, such as oil changes, brake pad replacement, timing belt replacements, and other services. These services can prevent or reduce the possibility of breakdowns or catastrophic failure to the vehicles. Breakdown or failure of vehicles during operation can result in unnecessary downtime and costs for the vehicles, delayed orders, accidents, and other problems.

Advantageously, in certain embodiments, this disclosure describes embodiments of real-time driver and vehicle analysis and alerting features that can be used to improve operation of a fleet of vehicles. The features can be used to identify potential problems with a driver or vehicle and provide a recommended treatment or service in real-time. In certain embodiments, user input may be received that is associated with the real-time feedback and a rule violation that triggered the real-time feedback. The user input may, for example, be associated with an indication of the rule violation that triggered the real-time feedback or further analyzed to update the driver and vehicle analysis.

Any of the systems and processes described herein can be performed in real-time or near real-time. As used herein, the term "real-time" and the like, in addition to having its ordinary meaning, can mean rapidly or within a certain expected or predefined time interval, and not necessarily immediately. For instance, real-time feedback may be provided within a few seconds, few minutes, or 5 minutes, or 10 minutes, or some other short period of time after receiving information that triggers the determination of the feedback.

II. Vehicle Management System

Figure 1:
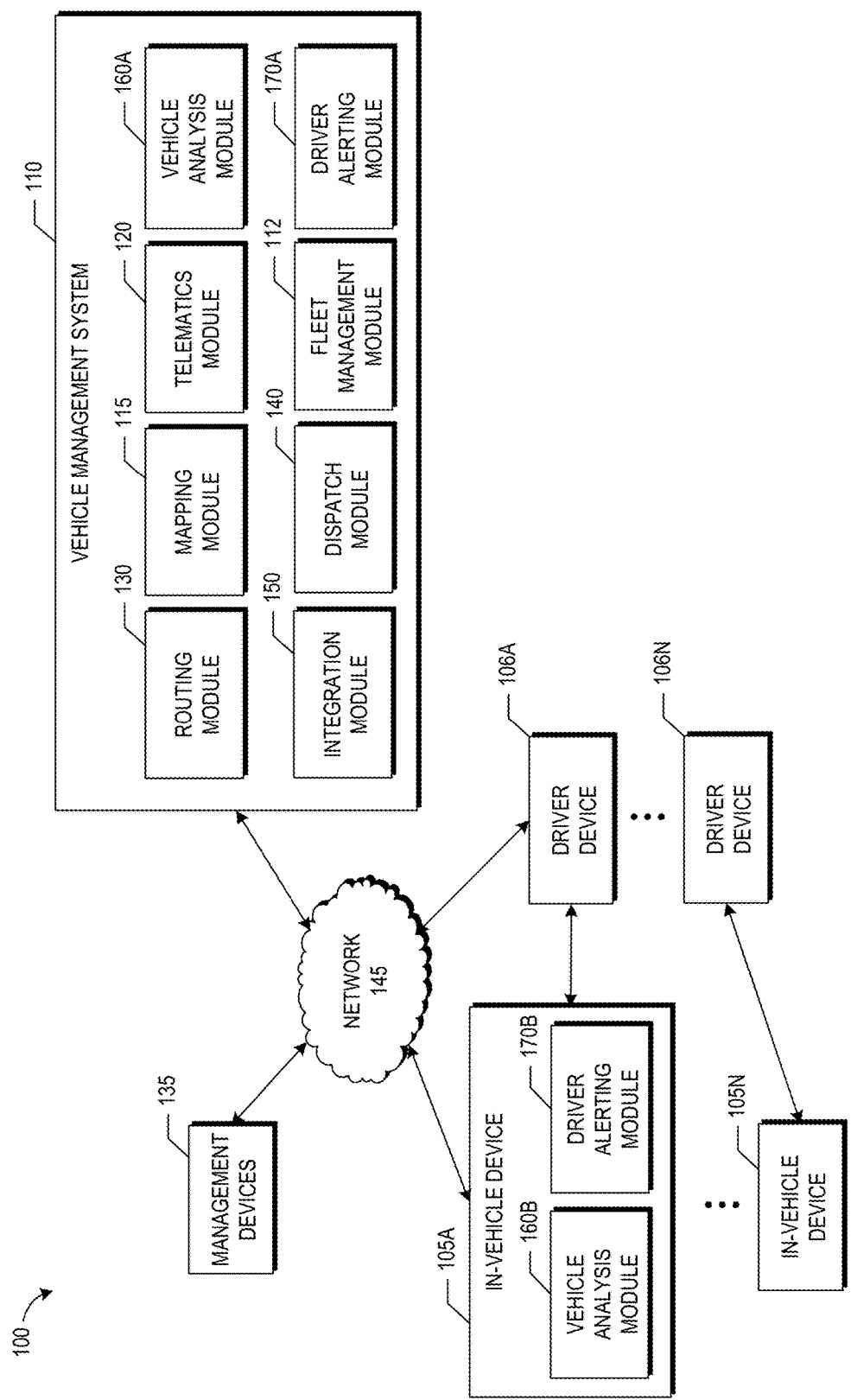
FIG. 1 illustrates an example computing environment including a vehicle management system and in-vehicle devices.

FIG. 1 illustrates a computing environment 100 for implementing an example of a vehicle management system 110, which is further described below. The example vehicle management system 110 shown includes a vehicle analysis module 160 that can perform analysis for vehicles and drivers of the vehicles. The vehicle analysis module 160 can be implemented by one or more physical computing devices, examples of which are provided below. The vehicle analysis module 160 can be configured to perform onboard and/or offboard analysis and may be implemented in the system 110 (as offboard module 160A) and/or in the in-vehicle devices (as onboard module 160B). The onboard vehicle analysis module 160B optionally included in the vehicle can include one or more computers coupled to the vehicle computer. For example, in one embodiment, the onboard vehicle analysis module 160B is a computing device or gateway device coupled to the vehicle computer through the OBDII port or CAN bus. The computing device can also be in communication with a radio device that transmits data from the computing device to the vehicle management system 110 or to other devices.

The vehicle analysis module 160A or 160B can collect and gather data and information about the engine from the vehicle computer and/or data from other sensors in or on the vehicle. The onboard vehicle analysis module 160B can communicate the collected vehicle data and information to the vehicle management system 110. In another embodiment, the onboard vehicle analysis module 160B filters or processes the data prior to sending the data to the vehicle management system 110. The onboard vehicle analysis module 160B can communicate some or all of the filtered data and information to the offboard vehicle analysis module 160A of the vehicle management system 110.

If the onboard vehicle analysis module 160B is unable to connect to a network or communicate with the vehicle management system 110, the onboard vehicle analysis module 160B can save and send the vehicle data when the onboard vehicle analysis module 160B is able to communicate with the server again. In some embodiments, the vehicle analysis module 160 can operatively couple with a mobile communication device located within the vehicle, such as a cell phone or other in-vehicle network capable electronic device. Vehicle diagnostic processes can be performed by the onboard vehicle analysis module 160B. The vehicle diagnostic processes can also be performed by the offboard vehicle analysis module 160A. In some embodiments, an initial analysis is performed by the onboard vehicle analysis module 160B and further analysis is performed by the offboard vehicle analysis module 160A.

The vehicle data collected by the onboard vehicle analysis module 160B can include vehicle condition information and engine data, such as vehicle year, make, model, engine/drive train, mileage, engine hours, start cycles, and other information related to vehicle condition. The vehicle data can also include check engine lights, fault codes, DTC codes, engine events, service intervals and other data collected from the engine computer. As mentioned above, the vehicle data collected by the onboard vehicle analysis module 160B can also include sensor data obtained from other sensors in the vehicle, such as tire pressure sensors, accelerometers, gyroscopes, temperature sensors, driver identification sensors (for example, that communicate with an ID badge of a driver via RFID or the like), combinations of the same, or the like.

The onboard vehicle analysis module 160B and the vehicle management system 110 can provide or analyze additional data that can be used for diagnostic analysis. For example, such data can include data provided by the manufacturer regarding diagnostic conditions, data obtained by crowd sourcing or otherwise analyzing data provided by a community of fleet vehicles (including, for example, predictive diagnoses based on community analysis of diagnostic trends), or the like.

The offboard vehicle analysis module 160A can output the analysis and prognostic information obtained from the onboard vehicle analysis module 160B to one of the management devices 135 operated by a fleet administrator or the like (which may be a mobile device), or any other device configured to receive notifications and updates from the offboard vehicle analysis module 160A. The output can include, for example, diagnostic codes or other diagnoses of vehicle problems, driver warnings, a list of proposed corrective actions, alarms, and/or other information provided by the onboard vehicle analysis module 160B to the system 110. Similarly, the onboard vehicle analysis module 160B can provide such outputs directly to the driver via an onboard computer (for example, on a display thereof) or via wired or wireless communication to one of the driver devices 106A, . . . , 106N (collectively driver devices 106), such as to a phone, a smartphone, a mobile device, a wearable device, and a computing device associated with the driver (for example, possessed, nearby, or carried by the driver). The outputs to the driver can include any of the outputs described above, as well as optionally navigation directions to dispatch the driver to a repair facility (for example, a nearest repair facility). The output could include a list of options of available service centers to perform the identified services, from which the driver can select and then be navigated to. Depending on the severity of the predicted failure, the outputs to the driver may, for more severe problems, provide rerouting to a nearest approved maintenance facility and navigate the driver to that location. For less severe problems, the outputs to the driver can indicate that maintenance should be performed soon or the like.

The output can also provide information and alerts to vehicle management system 110 or other fleet management personnel. The onboard vehicle analysis module 160B can analyze diagnostic data against one or more thresholds that are to be met prior to proceeding with changes to the vehicle route and/or recommending repairs. The thresholds can be machine-based and/or human-based thresholds. Machine-based thresholds could be determined by algorithms based on factors such as cost, time, energy usage, disruptive effect, and others. Human-based thresholds can include one or more approvals from the driver, vehicle maintenance personnel, management personnel, or others.

In some embodiments, the onboard vehicle analysis module 160B can filter data received from the engine computer and send a subset of the engine computer data (or other in-vehicle sensor data) to the offboard vehicle analysis module 160A. In some embodiments, the onboard vehicle analysis module 160B monitors the data received by the engine computer for changes. In one embodiment, when a change is detected, the updated data can be sent to the offboard vehicle analysis module 160A. For example, if the onboard vehicle analysis module 160B receives data from the engine computer continuously or substantially continuously, the onboard vehicle analysis module 160B may solely send data that was different from a previous set of data to the offboard vehicle analysis module 160A to conserve bandwidth. In another embodiment, the onboard vehicle analysis module 160B sends data periodically, such as once every hour or once every few hours, or even once a day or at longer intervals for measured parameters that change slowly.

Tire pressure data is an example of data that generally changes slowly. Instead of reporting tire pressure data to the vehicle management system 110 continuously or at frequent intervals (such as every 1 to 2 minutes), the onboard vehicle analysis module 160B can instead send updated tire pressure data to the vehicle management system 110 once per hour or couple of hours, once per day, or less frequently. In another embodiment, the onboard vehicle analysis module 160B sends updated tire pressure data to the vehicle management system 110 solely when the tire pressure changes more than a threshold amount. In another embodiment, the onboard vehicle analysis module 160B increases a frequency of transmission of sensor or engine data when the data changes more than a threshold amount. More generally, the onboard vehicle analysis module 160B can reduce, compress, or otherwise filter the diagnostic data sent to the vehicle management system 110.

The in-vehicle devices 105A, . . . , 105N (collectively referred to as in-vehicle devices 105) also include a driver alerting module 170. The driver alerting module 170 can be implemented by one or more physical computing devices, examples of which are provided herein. The driver alerting module 170 can perform onboard and/or offboard analysis and may be implemented in the system 110 (as offboard module 170A) and/or in the in-vehicle devices (as onboard module 170B). The driver alerting module 170A or 170B can receive the analyzed data from the vehicle analysis module 160 on a consistent basis in order to identify risky driving behaviors, like heavy braking and acceleration, average or maximum speeds, and so forth for a driver of a vehicle. In turn, the driver alerting module 170 can output alerts via wired or wireless communication for presentation to a driver of a vehicle to notify the driver of the risky driver behaviors and provide coaching to improve the driving performance of the driver. For example, the vehicle can include an attached display (for example, the display may be part of an entertainment system of the vehicle) that displays the alerts or coaching from the driver alerting module 170 providing driver information related to driver safety, how they are well driving, heavy braking or acceleration events, speeding occurrences, fuel efficiency, suggestions for improving driving, and idle times, for instance. Additionally or alternatively, one of the driver devices 106 associated with the driver of the vehicle can receive via wired or wireless communication (for example, directly from the onboard driver alerting module 170B via Bluetooth™ or near field communication or indirectly from the driver alerting module 170 via the network 145) the alerts or coaching from the driver alerting module 170 and display the alerts or coaching and, for instance, show a plurality of different outputs relating to driver safety, work efficiency, carbon Impact, fuel efficiency, idle time, electric and alternate fuel source vehicle performance, traffic, weather, vehicle skills, and other custom navigation options, for example. The alerts and coaching from the driver alerting module 170 can be provided in the form of real-time audible or textual messages, color changing displays, and vibrating of items, such as by vibrating one of the driver devices 106, chairs of the vehicle, or steering wheel of the vehicle, for example.

Figure 2:
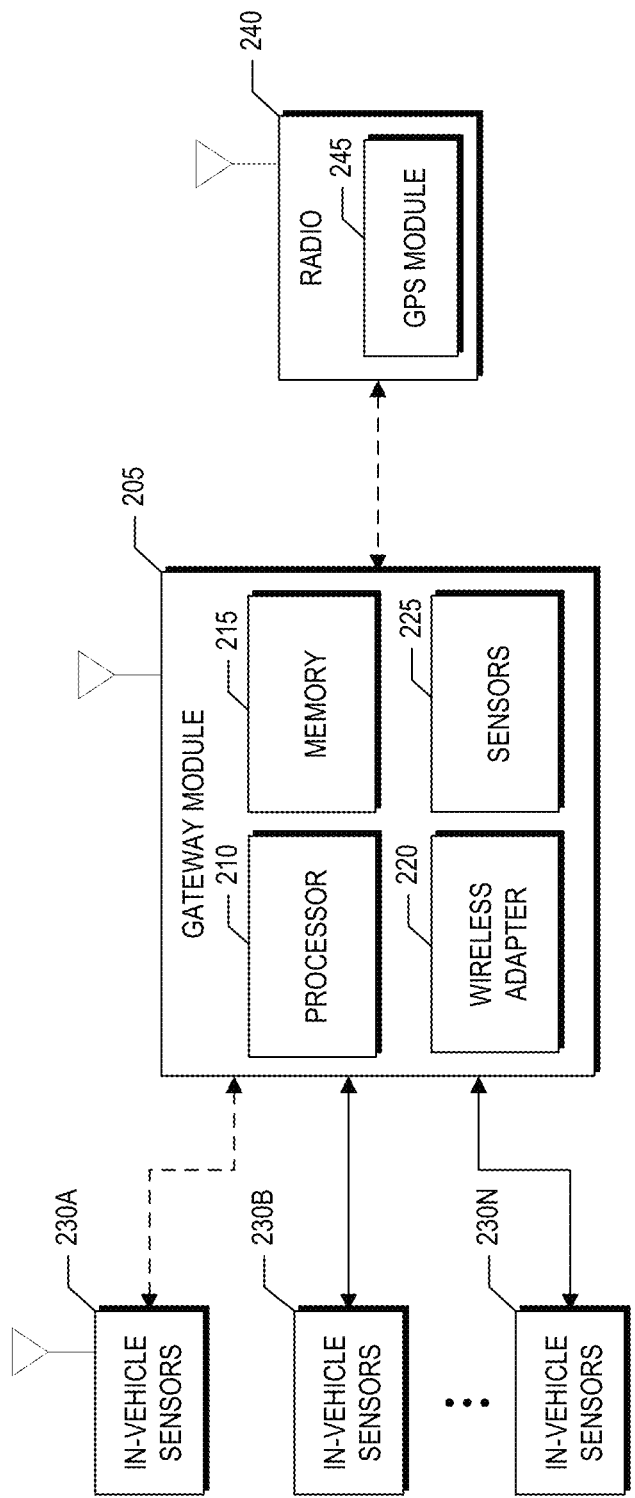
FIG. 2 illustrates an example in-vehicle device.

FIG. 2 illustrates a gateway module 205. The gateway module 205 is a more detailed embodiment of one of the in-vehicle devices 105 described herein and includes some or all the features thereof. The gateway module 205 can be a vehicle based data acquisition and transmission subsystem. In the depicted embodiment, the gateway module 205 has a processor 210, memory 215, a wireless adapter 220, and one or more sensors 225. In some embodiments, the sensors 225 are omitted. The sensors 225 can be configured to measure vehicle data, such as vehicle position, temperature, time, acceleration, audio, and direction.

A radio 240 communicates with the gateway module 205, either wirelessly or through a wired connection (for example, with a serial cable or the like). The radio 240 includes a GPS module 245 that detects vehicle position. The radio 240 can transmit data received from the gateway module 205 to the vehicle management system 110. The radio 240 can also communicate vehicle positioning data received from the GPS module 245 to the vehicle management system 110. In one embodiment, the radio 240 communicates with the vehicle management system by placing a cell phone call to a server of the vehicle management system 110. The radio 240 can also communicate with the server at the vehicle management system 110 using TCP/IP protocols. By sending data frequently or periodically, the radio 240 can keep the connection to the server open, which can guarantee or help to guarantee data reliability.

Any number of in-vehicle sensors 230 located within the vehicle can communicate with the gateway module 205. The in-vehicle sensors 230 can be located throughout the vehicle, including, for example, the engine, tires, vehicle body, trailer, cargo areas, and other locations on and within the vehicle. Some examples of vehicle sensors include engine oil sensors, fuel level sensors, light sensors, door sensors, ignition sensors, temperature sensors (including in cab and in trailer), and tire pressure sensors. At least some of the in-vehicle sensors 230 can communicate with the engine computer or other engine hardware configured to receive and process the data. The in-vehicle sensors can also be located remotely and can transmit the data wirelessly to the engine computer or other data processing hardware. For example, a tire pressure sensor could wirelessly transmit tire pressure data to the engine computer for processing.

Likewise, the gateway module 205 can also include sensors. One example of a sensor 225 that may be included in the gateway is an accelerometer. An accelerometer can detect hard braking, cornering, and acceleration. The accelerometer can therefore allow position coordinates to be updated without resort to GPS or triangulation technology. For example, the accelerometer can provide for short-term position reporting that operates without resorting to GPS signals. The gateway module 205 can offer a low cost longitude, latitude capability and combined hard braking sensor for vehicle history applications, such as the vehicle history systems and methods described in U.S. application Ser. No. 13/251,129, titled "History Timeline Display for Vehicle Fleet Management," filed Sep. 30, 2011, the disclosure of which is hereby incorporated by reference in its entirety. As a device, in certain embodiments, the gateway module 205 can enable data from multiple sensors to be acquired without adding wires or optical connections to the vehicle for those sensors.

The gateway module 205 can be in communication with some or all of the in-vehicle sensors 230. For example, the gateway module 205 can be coupled to an OBDII or CAN bus in the vehicle to thereby receive in-vehicle sensor information from the engine computer. In some embodiments, one or more in-vehicle sensors can be directly coupled to the gateway module 205, or the gateway module 205 can be configured to communicate wirelessly with the in-vehicle sensors. For example, the gateway module could receive cargo bay temperature data from a temperature sensor wirelessly transmitting the data. The wireless sensors can use point-to-point transmission using wireless transmission standards such as Bluetooth or Zigbee.

The processor 210 and memory 215 of the gateway module 205 can implement various features. Among others, the processor 210 of the gateway module 205 can perform the operations associated with the onboard vehicle analysis module 160 and the driver alerting module 170 described herein. The gateway module 205 can act as an intermediary processing platform for the vehicle management system 110. The gateway module 205 can process the data received from the in-vehicle sensors 230 and send a subset of the total data collected to the vehicle management system 110. The gateway module 205 can collect hundreds or thousands or more data points from sensors 225, in-vehicle sensors 230, and the engine computer. The gateway module 205 can, among other things, analyze, categorize, compress, or otherwise process the data before transmitting it to the vehicle management system 110. By preprocessing the data prior to sending the information to the vehicle management system 110, the gateway module 205 can determine what data to send to the vehicle management system 110, which can reduce redundant processing and bandwidth used to continually transmit vehicle data.

The gateway module 205 can monitor several vehicle characteristics. The sensors 225, 230 can provide information to the gateway module 205 at a specific frequency for each vehicle characteristic; however, the sensors 225, 230 may generally be recording data at a faster rate than the monitored vehicle characteristic is changing. As such, sending all of the data to the vehicle management system 110 every time a sensor provides data can waste bandwidth and provide redundant data points for the vehicle management system 110 to process. Advantageously, in certain embodiments, instead of sending all of this data to the vehicle management system 110, the gateway module 205 processes the data and selectively updates the vehicle management system 110. The gateway module 205 can also compress the data that is received. The gateway module 205 can selectively compress portions of data using compression techniques, including any lossy or lossless compression techniques. For example, the data relating to vehicle characteristics that are slowly changing can be compressed.

The gateway module 205 can process vehicle characteristics according to the rate at which the characteristics change. For example, engine characteristics can range from relatively slower changing characteristics, such as tire pressure or average fuel consumption, to relatively faster changing characteristics, such as engine RPM and speed. The gateway module 205 can provide updates to the vehicle management system 110 using different update approaches for each vehicle characteristic, including periodic updates, threshold-based updates, event-based updates, user-specified updates, and/or a combination of methods.

Periodic updates can provide updates to the vehicle management system 110 at a specified frequency. For example, the gateway module 205 may update the remaining vehicle fuel data every 5 minutes. Threshold based updates can provide updates when the value of the vehicle characteristic meets or exceeds a specified threshold. The thresholds can be static, determined dynamically by the system, user specified, or determined using any other method. The thresholds can be absolute, such as a specific value, or relative, such as a percentage based change a specific number of units. For example, tire pressure data could be updated when the tire pressure changes by 10%, or when it changes by 2 psi, or if pressure drops below 35 psi. Event-based updates can prompt updates after a specific event occurs. For example, an update of all the vehicle characteristics may be provided when the engine starts or when an engine error is detected.

The gateway module 205 can use a combination of methods or algorithms to determine the frequency of the updates to the vehicle management system 110. For example, the tire pressure data could have a periodic update and a threshold based update. The tire pressure data could be updated every 30 minutes. However if there was a blowout, it can be beneficial to have a more rapid or immediate update to the tire pressure. As such, the gateway module 205 could evaluate the tire pressure against a threshold that updates tire pressure when a change is detected. The gateway module 205 can provide update routines that are dependent on the operational phase of the vehicle, such as warm-up operation versus normal operation. As engine conditions stabilize after warm-up the gateway module 205 can increase the intervals at which updates are provided to the vehicle management system 110. In some embodiments the gateway module 205 can send the updated data to the vehicle management system 205 and the raw data. The raw vehicle data can include some or all of the data that the gateway module 205 receives from the sensors and vehicle computer. The raw data can be transmitted with or without the preprocessed updated vehicle data.

More generally, in certain embodiments, the gateway module 205 can be a system that performs wired and/or wireless data acquisition within a vehicle. The gateway module 205 can pool data from various sensors, apply time stamps to the data, reformat the data, compress the data, encode the data, and/or encrypt the data. Software running on the gateway module 205 can manage data acquisition and data formatting. The gateway module 205 can therefore acquire diagnostic bus and motor vehicle status data and forward the data, alerts, or coaching directly to the vehicle management system or another device, such as one of the driver devices 106 via Bluetooth™, WiFi™, Ethernet, RS232/422, USB or other suitable wired or wireless physical interfaces.

III. In-Vehicle Device Driver Feedback

In some embodiments, feedback about the driving performance of a driver during a day can be provided to the driver at the end of the day. For example, the vehicle data can be transmitted from a vehicle or a gateway device, such as one of the in-vehicle devices 105, associated with the vehicle to the vehicle management system 110. The vehicle management system 110 can then process the vehicle data in due course to evaluate the performance of the driver. Upon the conclusion of this processing, the vehicle management system 110 can transmit information about the performance of the driver to the vehicle or the gateway device associated with the vehicle for presentation to the driver.

Additionally or alternatively, the in-vehicle devices 105 can be used to leverage the application programming interfaces (APIs) that are available in a vehicle to collect and process the vehicle data and provide real-time feedback on the driving behavior of a driver of the vehicle. The driver alerting module 170 can be used to output an alert or coaching for presentation to the driver in an unobtrusive way. For instance, the driver alerting module 170 can output the alert or coaching to one of the driver devices 106 associated with the driver or an in-vehicle system, such as an in-vehicle display, speaker, seat-belt, or vehicle entertainment system associated with the vehicle that the driver is driving, to alert (for example, a vibration or change of item color) or coach (for example, verbal or written information) the driver in real-time about violations of laws or company rules while the driver is driving.

In one embodiment, when a driver enters a vehicle, one of the driver devices 106 associated with the driver can tie or associate to the vehicle or the gateway module 205. For example, a vehicle identification number (VIN) can be tied or associated to a smart phone of the driver so that the vehicle data gathered by the gateway module 205 can further be associated with the driver of the vehicle. As a result, when the driver drives different vehicles, the vehicle data associated with driving each of the different vehicles can be compiled and associated with the same driver.

The driver alerting module 170 can alert based on one or more conditions. For example, the driver alerting module 170 can alert when a driver exceeds a certain acceleration or deceleration limit. As another example, the driver alerting module 170 can alert when a driver exceeds a certain acceleration or deceleration limit (for example, more than ±5 miles per hours in one second or ±10 miles per hours in one second) when a vehicle is traveling less than one threshold speed (for example, 20 miles per hour) or greater than another threshold speed (for example, 60 miles per hour). Moreover, the driver alerting module 170 can perform computations with the vehicle data parameters to come up with a score or to determine thresholds, such as the threshold used for alerting the driver.

In view of the communication between the in-vehicle devices 105 and the vehicle management system 110, the vehicle management system 110 can provide information about roads, vehicle histories on roads, driver histories, or a driver's organization to the in-vehicle devices 105 so that the in-vehicle devices 105 can make more informed or appropriate alerts or coaching.

The driver alerting module 170 can look for patterns over time in the driving behavior of the driver. For example, the driver alerting module 170 can observe bad driving behavior over a series of days or weeks, such as repeated hard braking. To encourage better driving behavior, however, the driver alerting module 170 can note positive trends in bad driving behavior and provide coaching messages, such as for example "you are braking hard, but you are doing better than you did last week, so keep up the good work." Such tracking patterns can further facilitate a gamification of the alerts and coaching by the driver alerting module 170, where the drivers can receive achievements based on driving performance. As a result, the coaching can be more engaging to drivers, promoting further improved driving performance.

In one embodiment, the driver alerting module 170 can enable drivers to provide explanations of bad driving behavior or violations. For example, if a dog runs out in front of the vehicle and the driver slams on the brakes, the driver may receive a hard brake violation. The onboard driver alerting module 170B, in turn, can receive a user input from the driver, such as a bookmark of the violation for later discussion, a predefined text explanation of the violation, or a dictation of the explanation, so that the driver can associate an explanation with the violation and, for example, potentially not be penalized for the violation. The driver may input the user input via a user interface or acoustic sensor of one of the in-vehicle devices 105 or one or more other devices associated with the driver or vehicle and configured to communicate with the one of the in-vehicle devices 105.

The driver alerting module 170 can also determine whether the driver is likely driving and inform the driver regarding a needed change in an hours-of-service status. The term "hours-of-service status," in addition to having its ordinary meaning, can refer to whether a driver may be permitted continue driving in view of a total number of consecutive driving hours that the driver has been driving. For example, if the onboard vehicle analysis module 160B determines that the driver still has the seatbelt engaged, the vehicle engine is on, and the vehicle stopped, then the driver may be likely stuck in traffic and is probably still driving. If the driver has not finished a shift, the hours-of-service status of the driver may not need to be changed. On the other hand, if the driver has finished the shift, the driver may be alerted to potential needed change in the hours-of-service status of the driver.

Because the data processed by the driver alerting module 170 can be collected, at least in part, from the onboard vehicle analysis module 160B that are available in a vehicle, the vehicle data used by the driver alerting module 170 can be more reliable or detailed than information from other sources, such as the data from one of the driver devices 106. The vehicle data from the onboard vehicle analysis module 160B can also be very timely and enable the real-time feedback by the driver alerting module 170.

In some embodiments, an initial analysis, alerting, or coaching can be output by the onboard driver alerting module 170B and further analysis, alerting, or coaching can be performed by the offboard driver alerting module 170A. Additionally or alternatively, the onboard driver alerting module 170B can perform a subset of types of alerting or coaching, and the off board driver alerting module 170A can perform another subset of types of alerting or coaching that can be at least in part the same or different form the subset of types of alerting or coaching performed by the onboard driver alerting module 170B. Such local processing by the onboard driver alerting module 170B can relieve the processing burden on the vehicle management system 110 because vehicle data processing can be performed by the onboard driver alerting module 170B and shared with the vehicle management system 110 so that the offboard driver alerting module 170A need not perform the same or similar processing of the vehicle data. In an example computing environment that includes thousands or tens of thousands of in-vehicle devices 105, a significant amount of processing can be offloaded from the vehicle management system 110 to some or all of the in-vehicle devices 105.

IV. Real-Time Driver Feedback and User Input

The driver alerting module 170 can provide valuable a feedback to a driver to improve the drivers driving performance. However, the feedback may be inaccurate at times or may be inappropriate. The feedback can, for example, indicate that a vehicle or driver has committed a rule violation although the vehicle or driver has not actually committed the rule violation. The vehicle data collected by the vehicle analysis module 160 and used by the driver alerting module 170 to determine the rule violation may have been inaccurate, and the driver alerting module 170 may, as a result, incorrectly determine that the rule violation occurred. In another example, the rule data used to determine whether a rule violation occurred may be inaccurate and thus the driver alerting module 170 may incorrectly determine the occurrence of the rule violation when the rule violation itself is erroneous. Moreover, the reason for a rule violation may not be the fault of a vehicle or driver, or the vehicle or driver may have taken appropriate actions given particular circumstances and yet received feedback that discouraged the appropriate actions.

To, for instance, enable more accurate, appropriate, meaningful, or valuable feedbacks, the driver alerting module 170B can receive user inputs from the driver responding to the feedbacks provided by the driver alerting module 170. The ability of the driver alerting module 170 to receive the user inputs from a driver can enable a two-way exchange of information between the driver alerting module 170 and the driver about rule violations and feedbacks. The driver alerting module 170 can determine the rule violations and provide feedback further in view of past user inputs from one or more drivers and thereby better determine rule violations and provide more useful feedbacks in the future. In turn, a driver may better trust the driver alerting module 170 to provide valuable information, as well as the opportunity for greater understanding when there may be errors associated with the rule violations or feedbacks.

Figure 3:
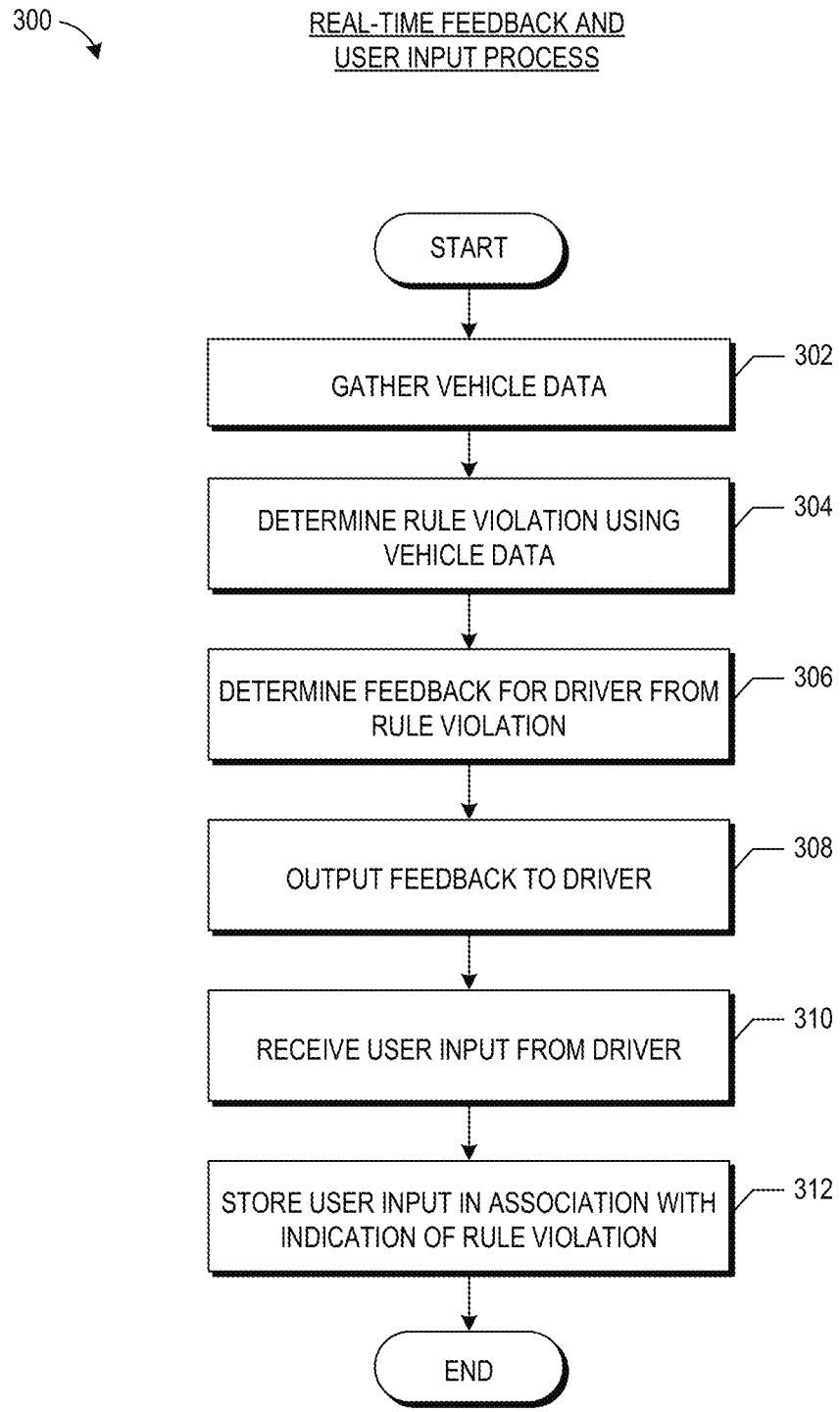
FIG. 3 illustrates an example real-time feedback and user input process.

FIG. 3 depicts a real-time feedback and user input process 300. The process 300 illustrates an example mode of operation of the computing environment 100 and may be implemented by the various components shown in the computing environment 100. For convenience, the process 300 is described in the context of the computing environment 100 but may instead be implemented by other systems described herein or other computing systems not shown. The process 300 provides one example approach by which one of the in-vehicle devices 105 can gather vehicle data for a vehicle, determine real-time feedback for a driver of the vehicle using the vehicle data, and enable a user to respond to the real-time feedback.

At block 302, the onboard vehicle analysis module 160B can gather vehicle data for a vehicle. For example, the onboard vehicle analysis module 160B can receive vehicle data from the in-vehicle sensors 230 around the vehicle or an engine computer of the vehicle while the driver is operating or driving the vehicle. As described herein, the vehicle data can include data regarding geographic coordinates, speed, seatbelt usage, fuel efficiency, braking, idle times, pitch/yaw, and routes associated with a vehicle. The onboard vehicle analysis module 160B can, moreover, receive vehicle data or driver data from one or more other sources, such as the vehicle management system 110 or via data inputs from the driver of the vehicle or a user of one of the management devices 135.

At block 304, the onboard driver alerting module 170B can process the vehicle data gathered by the onboard vehicle analysis module 160B to determine whether the vehicle or driver committed a rule violation. The onboard driver alerting module 170B can, for instance, access from the memory 215, multiple rules that prescribe rule violations associated with activities of the vehicle. The multiple rules can provide algorithms, conditional statements, or thresholds and the like that the onboard driver alerting module 170B can compare in real-time to the vehicle data or use to process the vehicle data to detect rule violations.

One approach of the multiple rules is for the multiple rules provide thresholds for determining whether the rule violation has occurred. Example thresholds include thresholds for speed, braking, acceleration, idling, pitch/yaw, or any other parameter that may be used for determining real-time feedback. Additionally or alternatively, the multiple rules may include other information for determining violations, such as driver abilities, vehicles types, geographic areas and associated thresholds for determining rules violations within the driver abilities, vehicle types, and geographic areas. For instance, the onboard driver alerting module 170B can compare a speed parameter from the vehicle data to a threshold to determine whether a speeding violation has occurred. In another example, the onboard driver alerting module 170B may determine that the vehicle data indicates the vehicle performed a hard braking rule violation. Other example determinations of violations include comparisons of hard braking, fuel efficiency, or vehicle health parameters to respective thresholds. In some embodiments, predefined thresholds may initially be set by a vehicle owner or a fleet manager. Additionally or alternatively, the determination of real-time feedback may be based on combinations of parameters, such as speed, acceleration, traction control, posted speed limits, or some combination thereof. Historical real-time feedback may further weight or influence the severity of current real-time feedback. In addition, the type of vehicle being driven by the driver can influence whether a rule violation may be determined; for instance, certain public safety vehicles, such as ambulances, may violate normal traffic laws at certain times.

The multiple rules can relate to many different types of rule violations. For instance, the multiple rules can provide rules for fuel efficient driving, minimum wear on vehicle driving, vehicle steering handling consistent with safe driving, proper use of signals, among other possible rules.

At block 306, the onboard driver alerting module 170B can determine a feedback for the driver responsive to the rule violation. The onboard driver alerting module 170B can, for instance, access from the memory 215, multiple driver feedbacks that prescribe feedbacks to the driver about rule violations including the rule violation. The multiple feedbacks can include multiple output feedback options as well as algorithms, conditional statements, or thresholds and the like that the onboard driver alerting module 170B can compare in real-time to the rule violation or use to process the rule violation to determine the feedback. The multiple output feedback options can, for instance, include audible, visual, or tactile feedback, as well as different alert parameters, such messages, durations, or frequencies. The multiple output feedback options can additionally be positive to encourage good driving behavior or negative to discourage bad driving behavior.

At block 308, the onboard driver alerting module 170B can output the feedback for presentation to the driver. The feedback can be output, for instance, using one or more of the approaches described herein. The feedback can be intended to attempt to improve a driving performance of the driver. In one example, where the onboard driver alerting module 170B determines that the hard braking violation occurred, the onboard driver alerting module 170B can output both audible and visual feedback to the driver indicating that the driver should try to brake more slowly in the future. In another example, the onboard driver alerting module 170B can output an animation on a screen responsive to the rule violation (for example, a green visual animation, such as a plant, which grows the better the driver drives or a plant turning brown or dying as the driver drivers less well) or quotations or facts regarding emissions or messages from celebrities. In some instances, the feedback may be delayed for a fixed or variable time until the driver reaches a particular performance threshold. In yet another example, if the driver exhibits good driving behavior, the onboard driver alerting module 170B can present the driver with a message such as, "Congratulations! You completed X days in a row without any violations." In some embodiments, the feedback can additionally be shared more broadly, such as with a manager of the driver or with multiple drivers in a fleet of vehicles so that the manager or the multiple drivers may also benefit from the feedback.

At block 310, the onboard driver alerting module 170B can receive user input from the driver responding to the feedback. The user input can be received, for instance, via a selectable interface element, such as a button or touchscreen, an acoustic sensor like a microphone positioned around or near the vehicle, an image sensor of a video camera that used detect user gestures, or another type of input interface. The user input can include (i) an explanation by the driver for the rule violation or (ii) a request from the driver to discuss the rule violation at a later time, for instance, such that the onboard driver alerting module 170B prompts the driver for the explanation at the later time.

In one example, the onboard driver alerting module 170B can receive the user input when the driver provides an audio input to the acoustic sensor that matches a capture initiation input, such as by speaking the word "discuss," and the onboard driver alerting module 170B can then capture the additional provided audio from the driver that includes the explanation for the rule violation. In another example, the onboard driver alerting module 170B outputs the feedback on a display as an alert and offers the driver multiple possible textual explanations on the display for the rule violation form which the driver select one to submit to the onboard driver alerting module 170B. In yet another example, the driver may select a "Discuss" user interface element as described in further detail herein. In an example where the driver would like to dispute the feedback about a speeding violation, the driver may provide the user input that indicates the posted, real-world speed limit does not match the speed limited presumed by the onboard driver alerting module 170B. In yet a further example, the onboard driver alerting module 170B can receive the user input when the driver performs a gesture captured by a video camera that matches a capture initiation input, a bookmark request input, or a gesture explanation input, and the onboard driver alerting module 170B can, for instance, then determine to request the explanation for the rule violation at a later time or capture video or audio from the driver that includes the explanation for the rule violation.

In some implementations, the driver may be provided a limited window of time (for example, 30 seconds, 1 minute, or 5 minutes) during which to provide the user input, after which time the onboard driver alerting module 170B may no longer accept the user input. Moreover, in some implementations, the driver may be requested to provide the user input in response to an inquiry message received from the vehicle management system 110, such as due to a request initiated by one of the management devices 135.

In some embodiments, the driver may provide the user input in stages. For example, the driver may initially bookmark the feedback notification and then, at a later time, provide a written or spoken response or select from a list of explanations regarding the feedback. As a result, the driver can respond to the feedback in real-time to acknowledge the feedback but provide details at the later time. In some instances, this may advantageously reduce the amount of distraction to the driver while driving is in progress so that the driver's attention may remain on the road. The driver, moreover, may submit biometrics data as part of the explanation in some implementations. For example, blood or urine analysis data, or other data indicative of whether the driver was sleeping or having a cardiac event and the like.

At block 312, the onboard driver alerting module 170B can store the user input in association with an indication of the rule violation in the memory 215. Such storage can enable later access of the user input and the indication by the driver of the vehicle or facilitate temporary storage of the user input and the indication before their communication to another device, such as the vehicle management system 110 or one of the management devices 135.

The process 300 can additionally, in certain embodiments, create a useful feedback loop for the driver and the onboard driver alerting module 170B, as well as a fleet of drivers and the vehicle management system 110.

In one example, the onboard driver alerting module 170B can use the user input to adjust (for instance, rewrite or revise an associated algorithm or conditional statement) or process differently (for instance, change an associated weighting or threshold) the multiple rules or the multiple feedbacks stored in the memory 215. As a result, the onboard driver alerting module 170B may, in effect, be (i) better able to determine erroneous rule violations or feedbacks, (ii) more or less forgiving or understanding towards the rule violation or feedback, or (iii) more or less inclined to discard, ignore, or report the rule violation or feedback to the driver. In some implementations, the onboard driver alerting module 170B can update the thresholds for the multiple rules or multiple feedbacks based on the user input. In one such implementation, the onboard driver alerting module 170B can use the user input and a previous threshold to determine a new threshold for a rule violation. Continuing with the speeding example, the user input regarding the feedback may indicate to the onboard driver alerting module 170B that the threshold or speed limit for particular geographic area is inaccurate and the onboard driver alerting module 170B may thus determine a new threshold. Again, in the speeding example, the second time a driver may drive through the geographic area at the same speed, the driver may not receive the feedback because the onboard driver alerting module 170B had increased the speeding threshold.

In another example, the onboard driver alerting module 170B can determine rule violations and output feedbacks using collected user inputs from multiple drivers of multiple vehicles in a vehicle fleet. For instance, the onboard driver alerting module 170B may receive data associated with user input data from the vehicle management system 110 to adjust (for instance, rewrite or revise an associated algorithm or conditional statement) or process differently (for instance, change an associated weighting or threshold) the multiple rules or the multiple feedbacks stored in the memory 215. As a result, the onboard driver alerting module 170B may, in effect, be (i) better able to determine erroneous rule violations or feedbacks, (ii) more or less forgiving or understanding towards the rule violation or feedback, or (iii) more or less inclined to discard, ignore, or report the rule violation or feedback to the driver. In one implementation, the onboard driver alerting module 170B may update a threshold for speeding violations in a particular geographic area based on one or more user inputs—for instance, because the onboard driver alerting module 170B may have had an incorrect speed limit stored for a particular geographic area and may update to the correct speed limit for that geographic area based on the one or more user inputs.

In some embodiments, at block 304, the determination of the rule violation can further trigger more than a default level of data collection or even new data collection by the onboard vehicle analysis module 160B. This may be so that additional data is available for understanding the rule violation, determining feedback for the driver, or providing greater details about the rule violation to the driver or manager of the driver at a later time. In one example, the determination of the rule violation can initiate the capture of image data with an image sensor like a camera, and the image data can be saved in the memory 215 along with the Association to the indication of the rule violation or the user input. The onboard vehicle analysis module 160B can additionally provide functionally for the driver to request that the conditions or details or information thereof (for example, environment, traffic signal, speed limit, low bridge, and the like) around the rule violation be replayed over a time, such as on a display at a later time, so that the driver may better understand the context of the rule violation when the driver may no longer be operating or driving the vehicle.

Although the process 300 is described as being implemented at least in part by the onboard driver alerting module 170B, the process 300 can further be incremented at least in part by the driver alerting module 170.

Figure 4:
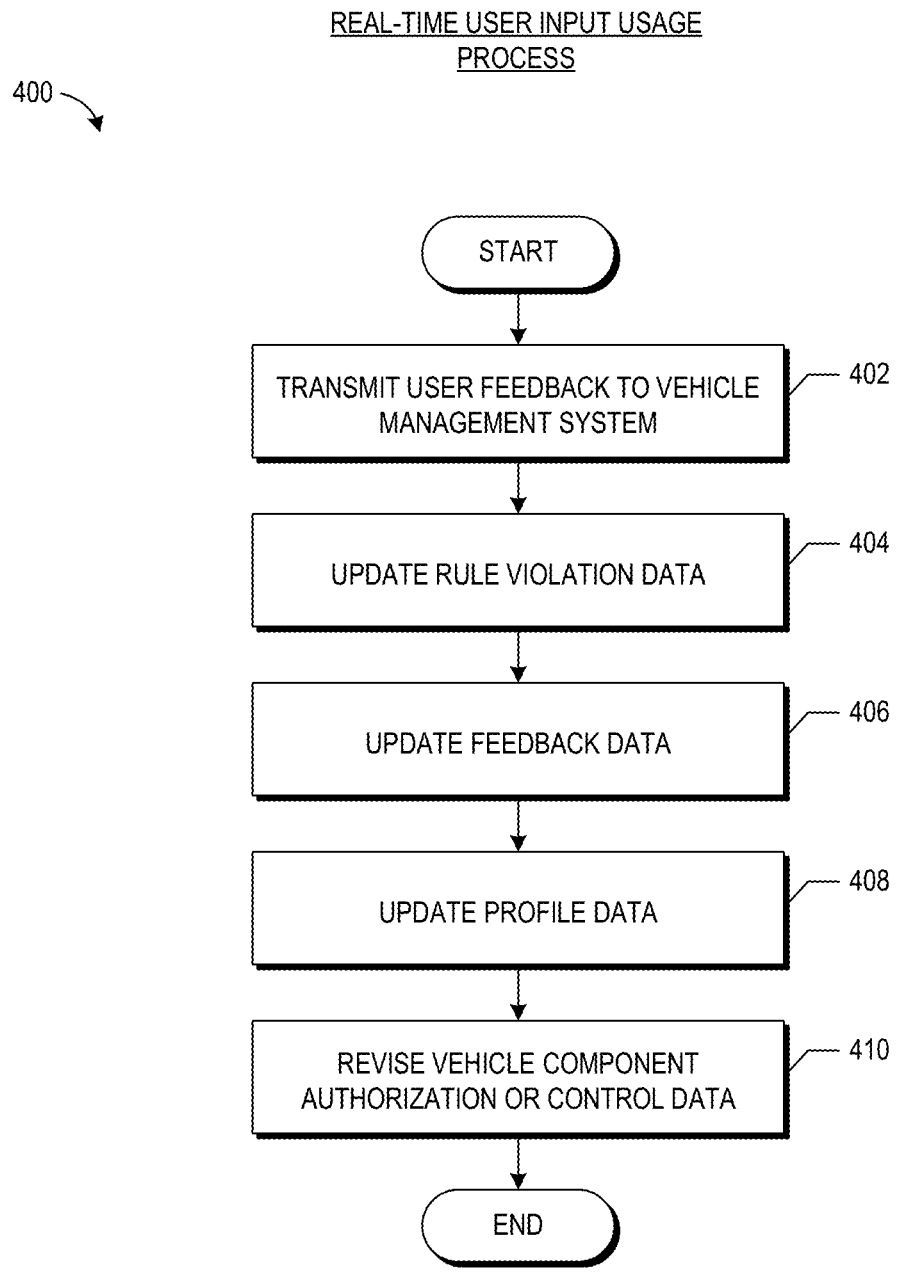
FIG. 4 illustrates an example real-time user input usage process.

FIG. 4 depicts a real-time user input usage process 400. The process 400 illustrates an example mode of operation of the computing environment 100 and may be implemented by the various components shown in the computing environment 100. For convenience, the process 400 is described in the context of the computing environment 100 but may instead be implemented by other systems described herein or other computing systems not shown. The process 400 provides one example approach by which one of the in-vehicle devices 105 can utilize the user input received from the driver during the process 300.

At block 402, the onboard driver alerting module 170B can transmit the user input and the indication of the rule violation to the vehicle management system 110. Moreover, in some embodiments, the onboard driver alerting module 170B can transmit indications of rule violations to the vehicle management system so that the indications are presented differently to a manager of the driver or vehicle when the indications have associated user inputs. For instance, when indications have associated user inputs, the indications may be displayed to the manager on a lower priority violation screen than the indications not having associated user inputs. This can be because the user inputs to note a greater likelihood that the indication of the rule violation may require less attention or investigation by the manager.

At block 404, the onboard driver learning module 170B can update rule violation data stored in the memory 215 in view of the user input. For example, the onboard driver learning module 170B can adjust the multiple rules stored in the memory based at least on the user input.

At block 406, the onboard driver learning module 170B can update feedback data stored in the memory 215 in view of the user input. For example, the onboard driver learning module 170B can adjust the multiple feedbacks stored in the memory based at least on the user input.

At block 408, the onboard driver learning module 170B can update maintained profile data for the driver, or the onboard vehicle analysis module 160B can update maintained profile data for the vehicle. The profile data can be used to track trends over time or predict maintenance for the vehicle or recommend training or corrective actions for the driver. The user input may be used to change how the indication of the rule violation impacts the profile data, such as by removing the indication of the rule violation from the profile data, diminishing its significance, or rejecting the user input as a valid explanation.

Additionally or alternatively, the user input may be used by the driver alerting module 170B to update a driver's score in game data. As discussed herein, a driver may receive a score by the onboard driver alerting module 170B based on their driving behavior. Their score may be negatively impacted or decremented based at least on the driving behavior factors discussed herein. Further, the onboard driver alerting module 170B may use the user input to waive the reduction in the driving score. For example, if the onboard driver alerting module 170B deducts a point from a driver's score based on a hard braking violation, the user input may cause the onboard driver alerting module 170B to not deduct the point from the driver's score.

At block 410, the onboard driver alerting module 170B can use the user input to revise component authorization or control data. For example, the onboard driver alerting module 170B can (i) adjust one or more settings (for instance, modes of operation, data gathering approaches, sensor sensitivities, or the like) of the vehicle management system 110, the vehicle analysis module 160, driver alerting module 170, or components of the vehicle like the in-vehicle sensors 230, (ii) install updated operating or calibration software on the vehicle management system 110, the vehicle analysis module 160, or driver alerting module 170, (iii) reset a component of the vehicle, (iv) cycle power of a component of the vehicle, (v) display a message (for instance, recommendations like the quality descriptor for addressing the quality issue or to bring a vehicle in for maintenance service) on a screen, (vi) disable a component of the vehicle, (vii) trigger a troubleshooting software to evaluate a component of the vehicle, the vehicle analysis module 160, or driver alerting module 170, (viii) adjust a routing schedule for the vehicle (for instance, adjusting a route determined by the routing module 112 to add a maintenance service stop in place of one or more previously assigned delivery stops and reassign the one or more previously assigned delivery stops to another vehicle), (ix) order a new part for the vehicle, or (x) schedule a maintenance appointment for a vehicle or driver.

Although the process 400 is described as performing all of the real-time user input usages described at blocks 402, 404, 406, 408, and 410, the process 400 can instead be reduced to just one block, two blocks, three blocks, or four blocks of blocks 402, 404, 406, 408, and 410 of the process 400. In addition, although the process 400 is described as being implemented at least in part by the onboard driver alerting module 170B, the process 400 can further be incremented at least in part by the driver alerting module 170.

V. Example User Interfaces for Real-Time Driving Feedback

Figure 5:
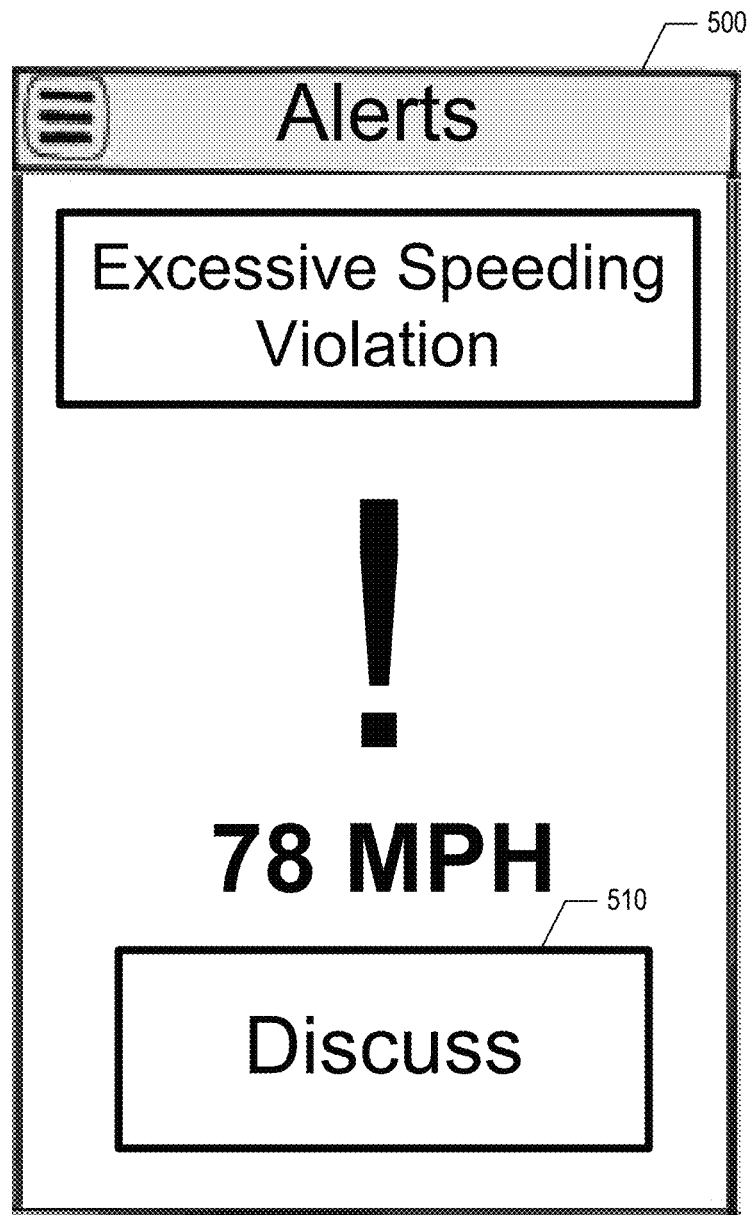

FIG. 5 depicts a user interface 500 for providing real-time feedback to a driver. The user interface 500 depicts an "excessive speeding violation" alert that may be presented to the driver. For example, the user interface 500 may correspond to the feedback output for presentation to the driver at block 308 of the process 300. As described herein, the user interface element 510 may allow the driver to provide the user input responding to the feedback. The user interface 500 may further present a warning instead of a violation when the onboard driver alerting module 170B determines that the driver has approached a threshold but has not exceeded it. For example, as illustrated, the driver may have exceeded a speed threshold by driving at a speed of 78 mph, however, the driver may be presented with a speed warning (not illustrated) user interface if the driver is determined to have been driving at 72 mph. The warning, in some instances, may not invite the driver to provide the user input as the warning may be considered a rule violation that may not warrant collecting user input from the driver in response to such a rule violation.

Figures 6A, 6B:
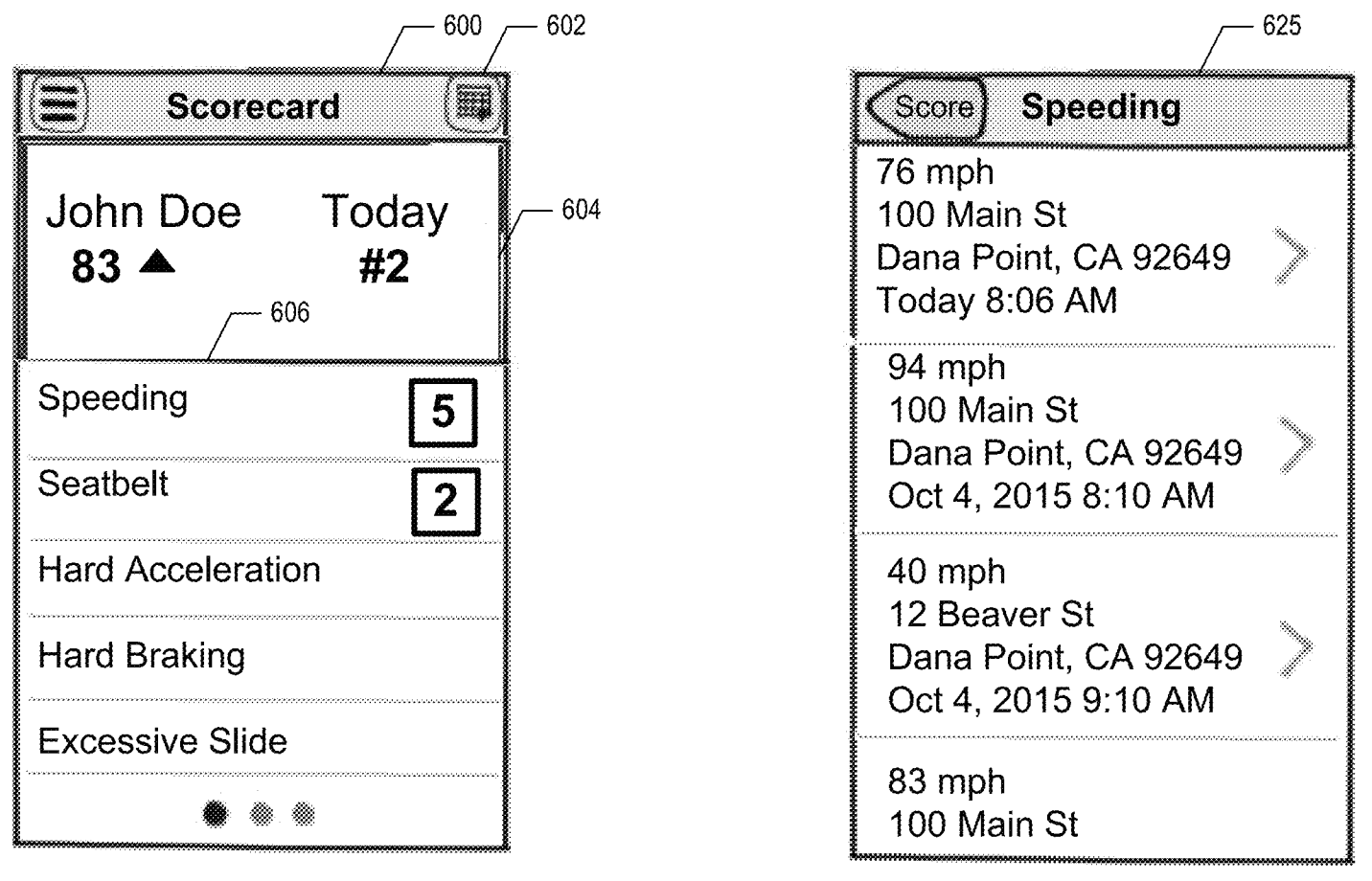
Figure 6D:
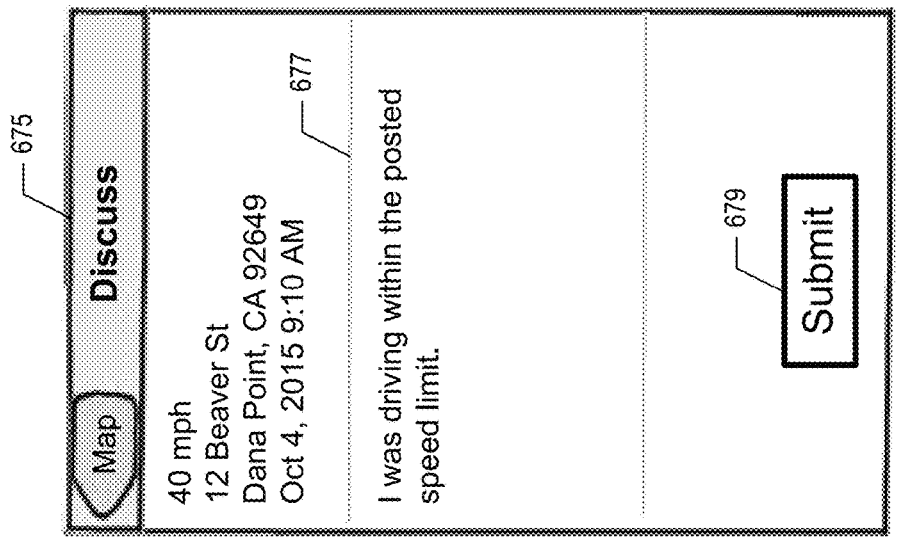
Figure 6C:
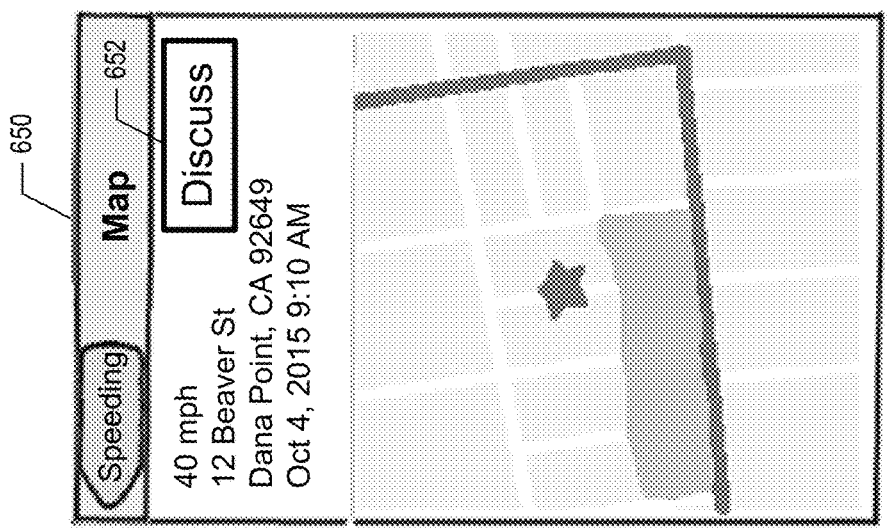

FIG. 6 depicts user interfaces 600, 625, 650, and 675 for providing real-time feedback to a driver. The user interface 600 depicts a scorecard. The user interface 600 includes a time period selector 602, a driver score or ranking area 604, and a driver feedback area 606. The time period selector 602 can allow the driver to select a day such as today, yesterday, or another period, such as this week, month, or year. As illustrated, the driver score or ranking area 604 can present a user's identifier, their driving score, their driving trend for the current period as compared to the previous period, and a rank for the period selected as compared to other drivers, such as other drivers in an associated fleet of vehicles. In some embodiments, a driving trend may correspond to an "up" or "down" trend compared to a previous period as indicated by an up or down arrow. The feedback area 606 can depict a list of rule violations or warnings. In some embodiments, the driver may select any of the particular rule violation or warning type to view a summary of those rule violation or warnings.

The user interfaces 600, 625, 650, and 675 can allow a driver to provide a user input responding to real-time feedback. The user interface 625 can depict a rule violation or warning history for the driver. In some embodiments, the user interface 625 may be presented after the driver selects a particular rule violation warning type in area 606. The driver may further select a particular rule violation in the user interface 625 and be presented with the user interface 650. The user interface 650 may present a map showing a location of where the rule violation or warning occurred. The user interface 650 includes a user interface element 652 that enables a user to provide the user input to respond to the real-time feedback. For example, user selection of the user interface element 652 may cause presentation of the user interface 675 that enables a user to further "discuss" the rule violation. The user interface 675 includes a message area 677 and a submission element 679. The driver may input a response message (for example, "I was driving within the posted speed limit.") into the message area 677 and may transmit the response message to the onboard driver alerting module 170B via selection of the submission element 679 for storage in the memory 215. The selection of the submission element 679 may further transmit the response message to the vehicle management system 110 for presentation to a manager of the driver, in some implementations.

VI. Local and Remote Real-Time Driving Feedback Processing

As discussed herein, in some embodiments, the systems described herein may perform local processing to reduce remote processing or reduce the use of remote computational resources. For example, local processing by the onboard driver alerting module 170B can relieve the processing burden on the vehicle management system 110 because vehicle data processing can be performed by the onboard driver alerting module 170B and shared with the vehicle management system 110 so that the offboard driver alerting module 170A need not perform the same or similar processing of the vehicle data.

Figure 7:
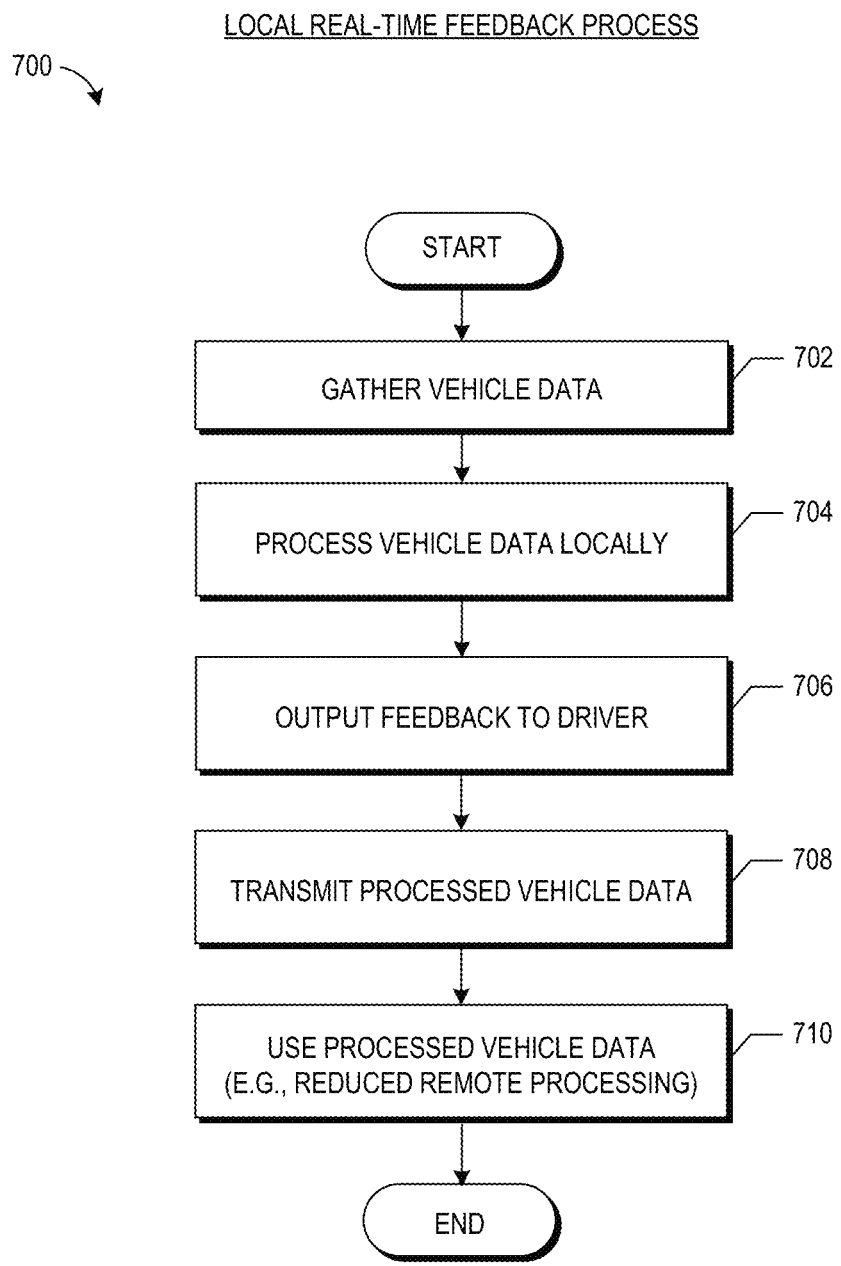
FIG. 7 illustrates an example local real-time feedback process.

FIG. 7 depicts a local real-time feedback process 700. The process 700 illustrates an example mode of operation of the computing environment 100 and may be implemented by the various components shown in the computing environment 100. For convenience, the process 700 is described in the context of the computing environment 100 but may instead be implemented by other systems described herein or other computing systems not shown. The process 700 provides one example approach by which vehicle data can be gathered locally and processed in a vehicle by the onboard driver alerting module 170B so that remote processing by the offboard driver alerting module 170A of the vehicle management system 110 may be reduced.

At block 702, the onboard vehicle analysis module 160B can gather vehicle data locally, which may be similar to block 302 of the process 300. At block 704, the onboard driver alerting module 170B can process the vehicle data gathered by the onboard vehicle analysis module 160B to determine real-time feedback locally, such as alerts and coaching, for a driver of the vehicle. Block 704 may be similar to blocks 304 and 306 of the process 300. At block 706, the onboard driver alerting module 170B can output the real-time feedback for presentation to the driver of the vehicle to attempt to improve the driving performance of the driver, which may be similar to block 308 of the process 300.

At block 708, the onboard vehicle analysis module 160B can transmit the processed vehicle data from block 704 to another device or system, such as the vehicle management system 110. For example, the rule violation or warning data that was computed by the on the other driver scores can be indicative of driving performances board vehicle analysis module 160B may be transmitted to the vehicle management system 110. Accordingly, portions of the vehicle data may not transmitted to the vehicle management system 110, which can reduce the network load or processing resources on the vehicle management system 110. At block 710, the vehicle management system 110 can use the processed vehicle data. One example use is that the vehicle management system 110 may generate metadata or summary data regarding drivers or vehicles. Other example uses of the processed data include automatically adjusting one or more settings of the vehicle management system 110, transmitting commands to the vehicle, or any number of uses, such as the uses for the user inputs as described herein.

VII. Telematics Application Access Permission Control

The driver alerting module 170 can maintain driver scores for drivers indicative of the driver's driving performances. Such driver scores can be maintained by telematics applications used by the drivers and be composites of multiple parameters from vehicle data or other data sources (for example, driver profiles or histories) and provide an overall sense of a driver's success at particular task. The driver scores advantageously, in certain embodiments, can be shared with multiple drivers across a fleet of vehicles and offer metrics or goals for individual drivers on their own driving performances. This can desirably improve driving performances of the multiple drivers in the fleet of vehicles. However, because the driver scores within the telematics application can represent a side-feature or distraction for the drivers rather than a primary function for the drivers, access to the driver scores within the telematics application can be controlled.

Figure 8:
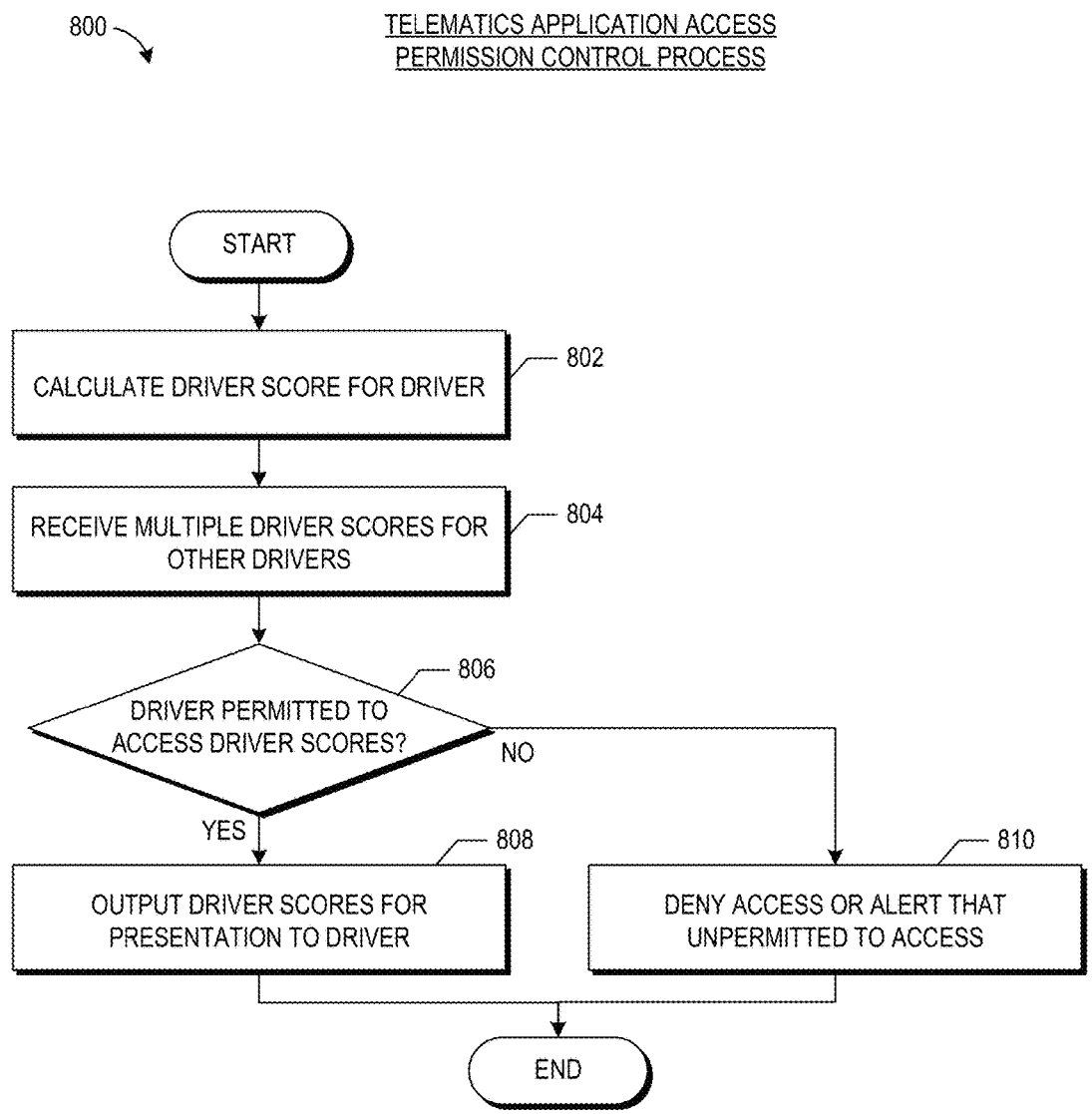
FIG. 8 illustrates an example telematics application access permission control process.

FIG. 8 depicts a telematics application access permission control process 800. The process 800 illustrates an example mode of operation of the computing environment 100 and may be implemented by the various components shown in the computing environment 100. For convenience, the process 800 is described in the context of the computing environment 100 but may instead be implemented by other systems described herein or other computing systems not shown. The process 800 provides one example approach by which one of the in-vehicle devices 105 can gather vehicle data for a vehicle, determine and process driver scores for multiple drivers, and control access to the driver scores for the multiple drivers.

At block 802, the onboard driver alerting module 170B can calculate a driver score for a driver of the vehicle based at least on vehicle data for a vehicle. For example, as described herein, the onboard vehicle analysis module 160B can receive vehicle data from the in-vehicle sensors 230 around the vehicle or an engine computer of the vehicle while the driver is operating or driving the vehicle, and the onboard vehicle analysis module 160B can provide the vehicle data to the onboard driver alerting module 170B. The onboard driver alerting module 170B can process the vehicle data according to a program instruction of multiple program instructions that prescribe conditions of a vehicle to be monitored, such as part of a status tracking program. The onboard driver alerting module 170B can, for instance, access from the memory 215, the multiple program instructions, which can provide algorithms, conditional statements, or thresholds and the like that the onboard driver alerting module 170B can compare to the vehicle data or use to process the vehicle data to calculate the driver score. As one example, the driver score can be indicative of fuel efficiency for the vehicle when driven by the driver. As another example, the driver score can be indicative of on-time deliveries by the vehicle when driven by the driver. As yet another example, the driver score can be indicative of counts of rule violations by the vehicle when driven by the driver.

In some implementations, the onboard driver alerting module 170B can first determine whether the driver is driving for a work task or a non-work task before performing the operation at block 802. The onboard driver alerting module 170B can, for instance, make this determination based on an instruction received from the vehicle management system 110. In response to determining that the driver is driving for the work task, the onboard driver alerting module 170B can calculate the driver score for the work task. On the other hand, in response to determining that the driver is driving for the non-work task, the onboard driver alerting module 170B may not calculate the driver score for the non-work task.

Moreover, in some implementations, the onboard driver alerting module 170B can first transmit an initiation message to the vehicle management system 110 requesting that the driver and the vehicle participate in a program associated with the program instruction. For instance, the initiation message can request that the driver and the vehicle participate in a fuel efficiency status tracking program in which a fuel efficiency score for the driver will be compared and monitored relative to fuel efficiency scores for multiple other drivers. The onboard driver alerting module 170B may receive an acknowledgment message from the vehicle management system 110 indicating that the driver and the vehicle are approved to participate in the program, which can subsequently trigger performing the operation at block 802. In addition, the onboard driver alerting module 170B can receive the program instruction corresponding to the program from the vehicle management system 110 in response to transmitting the initiation message.

At block 804, the onboard driver alerting module 170B can receive other driver scores from other drivers in a vehicle fleet that includes the vehicle. The other driving scores can be indicative of driving performances of the other drivers in the vehicle fleet and may be calculated in accordance with the same program instruction used to calculate the driver score at block 802.

At block 806, the onboard driver alerting module 170B can determine whether the driver is permitted to access the driver scores stored or managed by the onboard driver alerting module 170B in accordance with multiple access instructions. The onboard driver alerting module 170B can retrieve the multiple access instructions from the memory 215, and the multiple access instructions can prescribe when the driver of the vehicle is permitted to access information determined according to the multiple program instructions, such as for the status tracking program. Moreover, the onboard driver alerting module 170B can make the determination of whether the driver is permitted to access the driver scores in response to a request from the driver to access one or more of the driver scores.

The multiple access instructions can, for example, indicate that the drivers permitted to access one or more of the driver scores during a first time period but not during a second time period. As one example, the first time period can be when the vehicle is not moving and the second time period can be when the vehicle is moving. As another example, the first time period can include working hours for the driver and the second time period can include non-working hours for the driver. As yet another example, the length of the first time period or the second time period can depend on a driving history of the driver, such as a value indicative of a level of experience of the driver or an accident record associated with the driver.

At block 808, in response to determining that the driver is permitted to access the driver scores, the onboard driver alerting module 170B can output one or more of the driver scores for presentation to the driver, such as audibly or on a display to the driver. Many of the driver scores may be presented together on a display to facilitate comparison between drivers, such as in the case of a leaderboard.

At block 810, in response to determining that the driver is not permitted to access the driver scores, the onboard driver alerting module 170B can deny the driver access to the driver scores (for example, such as by denying a request to access the scores from the driver) or output an alert for presentation to the driver indicating that the driver is currently not permitted to access the driver scores. In one implementation, dealer can further indicate a reason that the driver is currently not permitted to access the driver scores, and the reason can correspond to an access limitation prescribed by the multiple access instructions.

In addition, in certain implementations, the multiple program instructions or the multiple access instructions can be adjusted, such as over time or in response to a command message received from the vehicle management system 110. For instance, the onboard driver alerting module 170B can receive a command message that indicates to further restrict or increase permitted access, such as for certain time periods, for the driver.

Although the process 800 is described with respect to vehicle-side processing and access control with one of the in-vehicle devices 105, processing and access control can be performed or maintained by the vehicle management system 110 additionally or alternatively. For example, the vehicle management system 110 may calculate driver scores and deny access to the driver scores or other information related to a program in accordance with the multiple access instructions. The vehicle management system 110 can, for instance, refuse requests for the driver scores or instead push updates out to one or more of the in-vehicle devices 105 with at times when the drivers associated with the one or more of the in-vehicle devices 105 may be permitted access to the driver scores.

In one example program, multiple of the in-vehicle devices 105 can each compete on the basis of which driver achieves the highest miles per gallon while performing their assigned routes. The multiple of the in-vehicle devices 105 can each request participation in the program and then download the program instructions for the program. Hourly during the workday, the driver alerting module 170 can, for instance, calculate driver scores and update leaderboards for the program. The drivers can generally update their driver scores as they perform their driving tasks and can access the driver scores during the workday and while their vehicles are not moving. However, some of the drivers may have greater limitations on their access to the scores as they are deemed to have a lower level of trust to access the information. Such drivers with greater limitations may be drivers that are newer to a vehicle fleet or have one or more accidents on the record. The access to the driver scores but each of the drivers can, moreover, vary over time for each of the drivers depending on dynamic, conditional, customizable, or adjustable criteria. At the conclusion of example program, one or more of the drivers can be awarded achievements or awards reflecting their successful accomplishments as part of the program.

VIII. Example Vehicle Management System

In the computing environment 100, one or more in-vehicle devices 105A . . . 105N and management devices 135 communicate with the vehicle management system 110 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 110. In addition, the in-vehicle devices 105 can report information to the vehicle management system 110, such as driver location, vehicle sensor data, vehicle status (for example, maintenance, tire pressure, or the like), and so forth.

The management devices 135 can be computing devices used by dispatchers, fleet managers, administrators, or other users to manage different aspects of the vehicle management system 110. For example, a user of one of the management devices 135 can access the vehicle management system 110 to generate routes, dispatch vehicles and drivers, and perform other individual vehicle or fleet management functions. With the management devices 135, users can access and monitor vehicle information obtained from one or more of the in-vehicle devices 105 by the vehicle management system 110. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network 145. In the depicted embodiment, the vehicle management system 110 includes a fleet management module 112, a mapping module 115, a telematics module 120, a routing module 130, a dispatch module 140, and an integration module 150. These components can, but need not, be integrated together on a common software or hardware platform.

The fleet management module 112 can include functionality for generating, rendering, or otherwise displaying a vehicle management user interface 114. The vehicle management user interface 114 can include a map or list of vehicles that depicts symbols or other data representative of vehicles. As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 112 can communicate with the mapping module 115 to obtain mapping data, which the fleet management module 112 can include in the vehicle management user interface 114. The mapping data can be compressed, transmitted, re-rendered, and displayed on the management user interface 114. Other data can also be overlaid to enhance the map and management layout. The mapping module 115 can be a geographic information system (GIS) in one embodiment. The fleet management module 112 can also access the telematics module 120 to obtain vehicle status data for inclusion in-vehicle history timelines. The telematics module 120 can provide this vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 130 can implement any of the routing features described above. In addition, the routing module 130 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 130 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 130 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 130.

Furthermore, although not shown, the vehicle management system 110 may include functionality for disabling an engine remotely to recover a stolen vehicle (as permitted in Europe and some other areas).

The illustrated network 145 may be a LAN, a WAN, the Internet, combinations of the same, or the like. For ease of illustration, the vehicle management system 110 has been depicted as a centralized system. However, in other implementations, at least some of the functionality of the vehicle management system 110 is implemented in other devices. Other possible implementations of the vehicle management system 110 can include many more or fewer components than those shown in FIG. 1.

IX. Terminology

Many other variations than those described herein will be apparent from this disclosure. For example, depending on the embodiment, certain acts, events, or functions of any of the algorithms described herein can be performed in a different sequence, can be added, merged, or left out all together (for example, not all described acts or events are necessary for the practice of the algorithm). Moreover, in certain embodiments, acts or events can be performed concurrently, for example, through multi-threaded processing, interrupt processing, or multiple processors or processor cores or on other parallel architectures, rather than sequentially.

Moreover, although some descriptions provided herein are described in terms of a vehicle and its driver, this disclosure extends to other contexts as well. For example, the embodiments described can apply to heavy machinery contexts where the equipment does not move and thus does not drive, yet the operator of the machinery may receive automatic coaching and to which the operator may provide user inputs responding to the coaching.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed:
1. A system comprising:
an electronic device comprising digital logic circuitry and configured to be installed in a vehicle, the electronic device comprising a port configured to couple with a vehicle computer installed in the vehicle in operable communication with a plurality of sensors disposed about the vehicle, wherein at least one of the plurality of sensors or else the electronic device itself comprises a video camera;
a display device to display a user interface having a plurality of selectable interface elements; and
a first memory device in communication with the electronic device, the first memory device storing:
a plurality of rules prescribing rule violations associated with activities of the vehicle, wherein the electronic device is configured to:
while a driver is operating the vehicle, determine in real-time at least one rule violation of the rule violations by the vehicle based at least on a comparison of the plurality of rules to vehicle data received from the vehicle computer or the plurality of sensors,
output the user interface to the display device for presentation to the driver, the user interface comprising a driver score area and an indication of at least one rule violation type,
receive, via a first selectable interface element displayed in the display device, a first user input from the driver, the first user input comprising a selection of one of the at least one rule violation type,
in response to the first user input, present at least one rule violation corresponding to the selected one of the at least one rule violation type in the user interface,
receive, via a second selectable interface element displayed in the display device, a second user input from the driver, the second user input comprising a selected one of the at least one rule violation,
in response to the second user input, present a message area in the user interface, and
receive, via a third selectable interface element displayed in the display device, a third user input from the driver, the third user input comprising a response message from the driver associated with the selected one of the at least one rule violation,
wherein the electronic device is configured to accept the response message from the driver in stages by the video camera capturing a predetermined initiation gesture by the driver, then accepting a written or spoken response or a selection from a list of explanations regarding the at least one rule violation type, then calculating a driver score for the driver based on the vehicle data, and then displaying the driver score in the driver score area, and wherein the driver score is indicative of fuel efficiency, on-time deliveries, or counts of rule violations.

2. The system of claim 1, wherein the electronic device is further configured to, in response to the second user input, present a map or a text indication showing a location of where the selected one of the at least one rule violation occurred in the user interface.

3. The system of claim 1, wherein the electronic device is further configured to, in response to the second user input, present a user interface element that enables the driver to provide the third user input in the user interface.

4. The system of claim 3, wherein the user interface element comprises the message area and a submission element.

5. The system of claim 1, wherein the electronic device is configured to:
store, in a second memory device, the third user input in association with an indication of the at least one rule violation, and
transmit the third user input and the indication of the at least one rule violation to a vehicle management system so that the third user input and the indication of the at least one rule violation are presented to a manager of the vehicle.

6. The system of claim 1, wherein the electronic device is configured to determine a rank for the driver based on a comparison of the driver score for the driver and driver scores for other drivers in associated fleet of vehicles, and display the rank in the driver score area.

7. The system of claim 1, wherein the electronic device is configured to update the driver score based at least on the at least one rule violation and the third user input.

8. The system of claim 5, wherein the electronic device is configured to remove the indication of the at least one rule violation from a driver profile associated with the driver based at least on the third user input.

9. The system of claim 1, wherein the third user input comprises a request from the driver to be prompted at a later time to discuss the selected one of the at least one rule violation or an explanation by the driver for selected one of the at least one rule violation.

10. A method comprising:
under control of an electronic device comprising digital logic circuitry and installed in a vehicle, the electronic device comprising a port configured to couple with a vehicle computer installed in the vehicle in operable communication with both a display device for displaying a user interface having a plurality of selectable interface elements and a plurality of sensors disposed about the vehicle, wherein at least one of the plurality of sensors or else the electronic device itself comprises a video camera:
while the a driver is operating the vehicle, determining in real-time at least one rule violation by the vehicle based at least on a comparison of vehicle data received from the vehicle computer or the plurality of sensors to a plurality of rules prescribing rule violations associated with activities of the vehicle retrieved from a first memory device in communication with the electronic device,
outputting the user interface to the display device for presentation to the driver, the user interface comprising a driver score area and an indication of at least one rule violation type, wherein the driver score area displays a driver score which is indicative of fuel efficiency, on-time deliveries, or counts of rule violations,
receiving, via a first selectable interface element displayed in the user interface, a first user input from the driver, the first user input comprising a selection of one of the at least one rule violation type,
in response to the first user input, presenting at least one rule violation corresponding to the selected one of the at least one rule violation type in the user interface,
receiving, via a second selectable interface element displayed in the user interface, a second user input from the driver, the second user input comprising a selected one of the at least one rule violation,
in response to the second user input, presenting a message area, and
receiving, via a third selectable interface element displayed in the user interface, a third user input from the driver, the third user input comprising a response message from the driver associated with the selected one of the at least one rule violation,
wherein the electronic device is configured to accept the response message from the driver in stages by the video camera capturing a predetermined initiation gesture by the driver and then accepting a written or spoken response or a selection from a list of explanations regarding the at least one rule violation type.

11. The method of claim 10, further comprising:
under the control of the electronic device:
presenting in response to the second user input, a map or a text indication showing a location of where the selected one of the at least one rule violation occurred in the user interface.

12. The method of claim 10, further comprising:
under the control of the electronic device:
presenting, in response to the second user input, a user interface element that enables the driver to provide the third user input in the user interface.

13. The method of claim 12, wherein the user interface element comprises the message area and a submission element.

14. The method of claim 10, further comprising:
under the control of the electronic device:
storing, in a second memory device, the third user input in association with an indication of the at least one rule violation, and
transmitting the third user input and the indication of the at least one rule violation to a vehicle management system so that the third user input and the indication of the at least one rule violation are presented to a manager of the vehicle.

15. A non-transitory physical computer storage comprising instructions stored thereon for implementing, in one or more processors, a method comprising:
while a driver is operating a vehicle having a vehicle computer installed in the vehicle in operable communication with both a display device for displaying a user interface having a plurality of selectable interface elements and a plurality of sensors disposed about the vehicle, wherein at least one of the plurality of sensors or else the vehicle computer itself comprises a video camera, determining in real-time at least one rule violation by the vehicle based at least on a comparison of vehicle data received from the vehicle computer or the plurality of sensors to a plurality of rules prescribing rule violations associated with activities of the vehicle,
outputting the user interface to the display device for presentation to the driver, the user interface comprising a driver score area and an indication of at least one rule violation type, wherein the driver score area displays a driver score which is indicative of fuel efficiency, on-time deliveries, or counts of rule violations, receiving, via a first selectable interface element, a first user input from the driver, the first user input comprising a selection of one of the at least one rule violation type, in response to the first user input, presenting at least one rule violation corresponding to the selected one of the at least one rule violation type in the user interface, receiving, via a second selectable interface element, a second user input from the driver, the second user input comprising a selected one of the at least one rule violation, in response to the second user input, presenting a message area, and receiving, via a third selectable interface element displayed in the display device, a third user input from the driver, the third user input comprising a response message from the driver associated with the selected one of the at least one rule violation, wherein the vehicle computer is configured to accept the response message from the driver in stages by the video camera capturing a predetermined initiation gesture by the driver and then accepting a written or spoken response or a selection from a list of explanations regarding the at least one rule violation type.

16. The non-transitory physical computer storage of claim 15, wherein the method, further comprises:
presenting, in response to the second user input, a map or a text indication showing a location of where the selected one of the at least one rule violation occurred.

17. The non-transitory physical computer storage of claim 15, wherein the method, further comprises:
presenting, in response to the second user input, a user interface element that enables the driver to provide the third user input.

18. The non-transitory physical computer storage of claim 17, wherein the user interface element comprises the message area and a submission element.

19. The non-transitory physical computer storage of claim 15, wherein the method, further comprises:
storing, in a second memory device, the third user input in association with an indication of the at least one rule violation, and
transmitting the third user input and the indication of the at least one rule violation to a vehicle management system so that the third user input and the indication of the at least one rule violation are presented to a manager of the vehicle.

\* \* \* \* \*